US011908379B2

(12) United States Patent
Wang

(10) Patent No.: US 11,908,379 B2
(45) Date of Patent: Feb. 20, 2024

(54) COLOR TEMPERATURE SELF-CALIBRATION SYSTEM AND COLOR TEMPERATURE CALIBRATION METHOD

(71) Applicant: BOE TECHNOLOGY GROUP CO., LTD., Beijing (CN)

(72) Inventor: Xian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 98 days.

(21) Appl. No.: 17/631,668

(22) PCT Filed: Dec. 25, 2020

(86) PCT No.: PCT/CN2020/139617
§ 371 (c)(1),
(2) Date: Jan. 31, 2022

(87) PCT Pub. No.: WO2022/134068
PCT Pub. Date: Jun. 30, 2022

(65) Prior Publication Data
US 2022/0398969 A1 Dec. 15, 2022

(51) Int. Cl.
*G09G 3/20* (2006.01)

(52) U.S. Cl.
CPC ... *G09G 3/2096* (2013.01); *G09G 2300/0452* (2013.01); *G09G 2320/0242* (2013.01); *G09G 2320/0666* (2013.01); *G09G 2330/021* (2013.01)

(58) Field of Classification Search
CPC ......... G09G 3/2096; G09G 2300/0452; G09G 2320/0242; G09G 2320/0666; G09G 2330/021
See application file for complete search history.

(56) References Cited

U.S. PATENT DOCUMENTS

2009/0021647 A1 1/2009 Choi et al.
2013/0241961 A1* 9/2013 Lu .......................... G09G 3/344 345/89
2016/0284284 A1 9/2016 Liu et al.
(Continued)

FOREIGN PATENT DOCUMENTS

CN 104766574 A 7/2015
CN 105931613 A 9/2016
(Continued)

*Primary Examiner* — Kwang-Su Yang
(74) *Attorney, Agent, or Firm* — IP & T GROUP LLP

(57) ABSTRACT

A color temperature calibration method includes: making a display screen display a test image at a target color temperature; measuring a chromaticity of a target pixel in the display screen to obtain measured color coordinates of the target pixel; comparing the measured color coordinates with standard color coordinates; if differences between the measured color coordinates and the standard color coordinates are greater than a target threshold, adjusting at least one of pixel values of the target pixel, until differences between re-obtained measured color coordinates and the standard color coordinates are not greater than the target threshold; and if differences between the measured color coordinates and the standard color coordinates are not greater than the target threshold, ending the color temperature calibration.

16 Claims, 14 Drawing Sheets

(56) References Cited

U.S. PATENT DOCUMENTS

| | | | | | |
|---|---|---|---|---|---|
| 2018/0033380 | A1 | 2/2018 | An | | |
| 2023/0132902 | A1* | 5/2023 | Hai | ...................... | G09G 3/2007<br>345/691 |

FOREIGN PATENT DOCUMENTS

| | | | |
|---|---|---|---|
| CN | 106023942 | A | 10/2016 |
| CN | 109147702 | A | 1/2019 |
| CN | 110662022 | A | 1/2020 |

* cited by examiner

COLOR TEMPERATURE SELF-CALIBRATION SYSTEM AND COLOR TEMPERATURE CALIBRATION METHOD

CROSS-REFERENCE TO RELATED APPLICATION

This application is a national phase entry under 35 USC 371 of International Patent Application No. PCT/CN2020/139617, filed on Dec. 25, 2020, which is incorporated herein by reference in its entirety.

TECHNICAL FIELD

The present disclosure relates to the field of display technologies, and in particular, to a color temperature calibration method and a color temperature self-calibration system.

BACKGROUND

Color temperature is a fixed value that represents the color of light, and it is one of the general indexes that indicate the spectral quality of a light source. Proportions of various color components in the light of different light sources (such as the sun, fluorescent lamps, incandescent lamps, etc.) are not the same. If the color temperature of the light is high, it means that the light includes more short waves, and the light tends to be bluish green. If the color temperature of the light is low, it means that the light includes more long waves, and the light tends to be reddish yellow.

Based on this, according to the properties of the light source, by adjusting proportions of various color components of a display screen in a terminal (e.g., a mobile phone or a tablet computer), it may be possible to adjust the color temperature of the display screen. With different color temperatures, the display screen brings users different feelings of cold or warm. A standard color temperature of a display screen is usually 6500 K (i.e., D65), and other common color temperatures are 9300 K, 5500 K, 5000 K, etc. In an image quality calibration of the display screen, 6500 K is usually taken as a standard.

However, if the color temperature of the display screen is not correctly calibrated, the image quality calibration of the display screen is prone to deviation. For example, it may cause distortions in the warm and cold tones of the display screen.

SUMMARY

In an aspect, a color temperature calibration method is provided. The color temperature calibration method includes:

making a display screen display a test image at a target color coordinates, and measuring a chromaticity of a target pixel in the display screen to obtain measured color coordinates of the target pixel;

comparing the measured color coordinates with standard color coordinates;

if differences between the measured color coordinates and the standard color coordinates is greater than a target threshold, adjusting at least one of pixel values of the target pixel, until differences between re-obtained measured color coordinates and the standard color coordinates are not greater than the target threshold; and if differences between the measured color coordinates and the standard color coordinates is not greater than the target threshold, ending the color temperature calibration.

In some embodiments, the measured color coordinates include a measured coordinate in a first direction and a measured coordinate in a second direction; and the standard color coordinates include a standard coordinate in the first direction and a standard coordinate in the second direction.

Comparing the measured color coordinates with the standard color coordinates includes: comparing the measured coordinate in the first direction with the standard coordinate in the first direction, and comparing the measured coordinate in the second direction with the standard coordinate in the second direction.

The differences between the measured color coordinates and the standard color coordinates being greater than the target threshold includes that: a difference between the measured coordinate in the first direction and the standard coordinate in the first direction is greater than the target threshold, and a difference between the measured coordinate in the second direction and the standard coordinate in the second direction is greater than the target threshold.

In some embodiments, the target pixel includes a first sub-pixel, a second sub-pixel and a third sub-pixel of different colors. Adjusting the at least one of the pixel values of the target pixel includes: adjusting at least one of a pixel value of the first sub-pixel, a pixel value of the second sub-pixel, and a pixel value of the third sub-pixel, according to which of the measured coordinate in the first direction and the standard coordinate in the first direction is greater, and which of the measured coordinate in the second direction and the standard coordinate in the second direction is greater.

In some embodiments, adjusting the at least one of the pixel value of the first sub-pixel, the pixel value of the second sub-pixel, and the pixel value of the third sub-pixel, according to which of the measured coordinate in the first direction and the standard coordinate in the first direction is greater, and which of the measured coordinate in the second direction and the standard coordinate in the second direction is greater: determining whether the measured coordinate in the first direction is greater than the standard coordinate in the first direction, and whether the measured coordinate in the second direction is greater than the standard coordinate in the second direction;

if it is determined that the measured coordinate in the first direction is greater than the standard coordinate in the first direction, and the measured coordinate in the second direction is greater than the standard coordinate in the second direction, keeping the pixel value of the third sub-pixel unchanged, and adjusting the pixel values of the first sub-pixel and the second sub-pixel based on a first adjustment mode; or if it is determined that the measured coordinate in the first direction is not greater than the standard coordinate in the first direction, and/or the measured coordinate in the second direction is not greater than the standard coordinate in the second direction, keeping the pixel value of the first sub-pixel unchanged, and adjusting pixel values of the third sub-pixel and the second sub-pixel based on a second adjustment mode.

In some embodiments, adjusting the pixel values of the first sub-pixel and the second sub-pixel based on the first adjustment mode includes:

determining whether the difference between the measured coordinate in the first direction and the standard coordinate in the first direction is less than a first threshold;

if it is determined that the difference between the measured coordinate in the first direction and the standard coordinate in the first direction is not less than the first threshold, decreasing the pixel value of the first sub-pixel, re-obtaining a measured coordinate in the first direction corresponding to the target pixel of which the pixel value of the first sub-pixel is adjusted, and determining the difference between the re-obtained measured coordinate in the first direction and the standard coordinate in the first direction, until the difference between the re-obtained measured coordinate in the first direction and the standard coordinate in the first direction is less than the first threshold; and if it is determined that the difference between the measured coordinate in the first direction and the standard coordinate in the first direction is less than the first threshold, decreasing the pixel value of the second sub-pixel, re-obtaining a measured coordinate in the second direction corresponding to the target pixel of which the pixel value of the second sub-pixel is adjusted, and determining the difference between the measured coordinate in the second direction and the standard coordinate in the second direction, until the difference between the re-obtained measured coordinate in the second direction and the standard coordinate in the second direction is less than a second threshold.

In some embodiments, the first threshold is greater than the second threshold, and the target threshold is less than or equal to the second threshold. The color temperature calibration method further includes: if it is determined that the difference between the re-obtained measured coordinate in the second direction and the standard coordinate in the second direction is less than the second threshold, comparing a measured coordinate in the first direction in a current state with the standard coordinate in the first direction; and if it is determined that a difference between the measured coordinate in the first direction in the current state and the standard coordinate in the first direction is not less than the second threshold, determining whether the measured coordinate in the first direction in the current state is greater than the standard coordinate in the first direction; if it is determined that the measured coordinate in the first direction in the current state is greater than the standard coordinate in the first direction, decreasing the pixel value of the first sub-pixel; if it is determined that the measured coordinate in the first direction in the current state is less than the standard coordinate in the first direction, increasing the pixel value of the first sub-pixel; re-obtaining a measured coordinate in the first direction corresponding to the target pixel of which the pixel value of the first sub-pixel is adjusted; and determining a difference between the re-obtained measured coordinate in the first direction and the standard coordinate in the first direction, until the difference between the re-obtained measured coordinate in the first direction and the standard coordinate in the first direction is less than the second threshold.

In some embodiments, the second threshold is greater than the third threshold, and the target threshold is not less than the third threshold. The color temperature calibration method further includes: if it is determined that the difference between the re-obtained measured coordinate in the first direction and the standard coordinate in the first direction is less than the second threshold, adjusting the pixel values of the first sub-pixel and the second sub-pixel based on a first sub-adjustment mode, re-obtaining measured color coordinates corresponding to the target pixel of which the pixel values of the first sub-pixel and the second sub-pixel are adjusted, determining differences between the re-obtained measured color coordinates and the standard color coordinates, until a difference between a re-obtained measured coordinate in the first direction in the re-obtained measured color coordinates and the standard coordinate in the first direction is not greater than a third threshold, and/or a difference between a re-obtained measured coordinate in the second direction in the re-obtained measured color coordinates and the standard coordinate in the second direction is not greater than the third threshold, and ending the color temperature calibration.

Optionally, the first sub-adjustment mode includes:

if the re-obtained measured coordinate in the first direction is less than the standard coordinate in the first direction, and the re-obtained measured coordinate in the second direction is less than the standard coordinate in the second direction, increasing the pixel values of the first sub-pixel and the second sub-pixel;

if the re-obtained measured coordinate in the first direction is less than the standard coordinate in the first direction, and the re-obtained measured coordinate in the second direction is greater than the standard coordinate in the second direction, increasing the pixel value of the first sub-pixel or decreasing the pixel value of the second sub-pixel;

if the re-obtained measured coordinate in the first direction is greater than the standard coordinate in the first direction, and the re-obtained measured coordinate in the second direction is less than the standard coordinate in the second direction, decreasing the pixel value of the first sub-pixel or increasing the pixel value of the second sub-pixel; and if the re-obtained measured coordinate in the first direction is greater than the standard coordinate in the first direction, and the re-obtained measured coordinate in the second direction is greater than the standard coordinate in the second direction, decreasing the pixel values of the first sub-pixel and the second sub-pixel.

In some embodiments, adjusting the pixel values of the third sub-pixel and the second sub-pixel based on the second adjustment mode includes:

if the measured coordinate in the first direction is less than the standard coordinate in the first direction, and the measured coordinate in the second direction is less than the standard coordinate in the second direction, performing a first method; if the measured coordinate in the first direction is less than the standard coordinate in the first direction, and the measured coordinate in the second direction is greater than the standard coordinate in the second direction, performing a second method; and if the measured coordinate in the first direction is greater than the standard coordinate in the first direction, and the measured coordinate in the second direction is less than the standard coordinate in the second direction, performing a third method.

In some embodiments, the first method includes:

determining whether the difference between the measured coordinate in the first direction and the standard coordinate in the first direction is less than the first threshold;

if it is determined that the difference between the measured coordinate in the first direction and the standard coordinate in the first direction is not less than the first threshold, decreasing the pixel value of the third sub-pixel, re-obtaining a measured coordinate in the first direction corresponding to the target pixel of which the pixel value of the third sub-pixel is adjusted, and determining a difference between the re-obtained measured coordinate in the first direction and the standard coordinate in the first direction, until the difference between the re-obtained measured coordinate in the first direction and the standard coordinate in the first direction is less than the first threshold; and if it is determined that the difference between the measured coordinate in the first direction and the standard coordinate in the first direction is less than the first threshold, determining whether the measured coordinate in the second direction is greater than the standard coordinate in the second direction; if it is determined that the measured coordinate in the second direction is greater than the standard coordinate in the second direction, decreasing the pixel value of the second sub-pixel; if it is determined that the measured coordinate in the second direction is not greater than the standard coordinate in the second direction, increasing the pixel value of the second sub-pixel; re-obtaining a measured coordinate in the second direction corresponding to the target pixel of which the pixel value of the second sub-pixel is adjusted, and determining a difference between the re-obtained measured coordinate in the second direction and the standard coordinate in the second direction, until the difference between the re-obtained measured coordinate in the second direction and the standard coordinate in the second direction is less than a second threshold.

In some embodiments, the first threshold is greater than the second threshold, and the target threshold is less than or equal to the second threshold. The color temperature calibration method further includes: if the difference between the re-obtained measured coordinate in the second direction and the standard coordinate in the second direction is less than the second threshold, comparing a measured coordinate in the first direction in a current state with the standard coordinate in the first direction; and if it is determined that a difference between the measured coordinate in the first direction in the current state and the standard coordinate in the first direction is not less than the second threshold, determining whether the re-obtained measured coordinate in the first direction is greater than the standard coordinate in the first direction; if it is determined that the measured coordinate in the first direction in the current state is greater than the standard coordinate in the first direction, increasing the pixel value of the third sub-pixel; if it is determined that the measured coordinate in the first direction in the current state is less than the standard coordinate in the first direction, decreasing the pixel value of the third sub-pixel; re-obtaining a measured coordinate in the first direction corresponding to the target pixel of which the pixel value of the third sub-pixel is adjusted, determining a difference between the re-obtained measured coordinate in the first direction and the standard coordinate in the first direction, until the difference between the re-obtained measured coordinate in the first direction and the standard coordinate in the first direction is less than the second threshold.

In some embodiments, the second threshold is greater than the third threshold, and the target threshold is not less than the third threshold. The color temperature calibration method further includes: if the difference between the re-obtained measured coordinate in the first direction and the standard coordinate in the first direction is less than the second threshold, adjusting the pixel values of the second sub-pixel and the third sub-pixel based on a second sub-adjustment mode, re-obtaining measured color coordinates corresponding to the target pixel of which the pixel values of the second sub-pixel and the third sub-pixel are adjusted, determining differences between the re-obtained measured color coordinates and the standard color coordinates, until a difference between a re-obtained measured coordinate in the first direction in the re-obtained measured color coordinates and the standard coordinate in the first direction is not greater than a third threshold, and/or a difference between a re-obtained measured to coordinate in the second direction in the re-obtained measured color coordinates and the standard coordinate in the second direction is not greater than the third threshold, and ending the color temperature calibration.

In some embodiments, the second method includes:

determining whether the difference between the measured coordinate in the first direction and the standard coordinate in the first direction is less than the first threshold;

if it is determined that the difference between the measured coordinate in the first direction and the standard coordinate in the first direction is not less than the first threshold, decreasing the pixel value of the third sub-pixel, re-obtaining a measured coordinate in the first direction corresponding to the target pixel of which the pixel value of the third sub-pixel is adjusted, and determining a difference between the re-obtained measured coordinate in the first direction and the standard coordinate in the first direction, until the difference between the re-obtained measured coordinate in the first direction and the standard coordinate in the first direction is less than the first threshold; and if it is determined that the difference between the measured coordinate in the first direction and the standard coordinate in the first direction is less than the first threshold, decreasing the pixel value of the second sub-pixel, re-obtaining a measured coordinate in the second direction corresponding to the target pixel of which the pixel value of the second sub-pixel is adjusted, and determining a difference between the re-obtained measured coordinate in the second direction and the standard coordinate in the second direction, until the difference between the re-obtained measured coordinate in the second direction and the standard coordinate in the second direction is less than a second threshold.

In some embodiments, the first threshold is greater than the second threshold, and the target threshold is less than or equal to the second threshold. The color temperature calibration method further includes: if the difference between the re-obtained measured coordinate in the second direction and the standard coordinate in the second direction is less than the second threshold, comparing a measured coordinate in the first direction in a current state with the standard coordinate in the first direction; and if it is determined that a difference between the measured coordinate in the first direction in the current state and the standard coordinate in the first direction is not less than the second threshold, determining whether the measured coordinate in the first direction in the current state is greater than the standard coordinate in the first direction; if it is determined that the measured coordinate in the first direction is greater than the standard coordinate in the first direction, increasing the pixel value of the third sub-pixel; if it is determined that the measured coordinate in the first direction in the current state is not greater than the standard coordinate in the first direction, decreasing the pixel value of the third sub-pixel; re-obtaining a measured coordinate in the first direction corresponding to the target pixel of which the pixel value of the third sub-pixel is adjusted, and determining a difference between the re-obtained measured coordinate in the first direction and the standard coordinate in the first direction, until the difference between the re-obtained measured coordinate in the first direction and the standard coordinate in the first direction is less than the second threshold.

In some embodiments, the second threshold is greater than the third threshold, and the target threshold is not less than the third threshold. The color temperature calibration method further includes: if the difference between the re-obtained measured coordinate in the first direction and the standard coordinate in the first direction is less than the second threshold, adjusting the pixel values of the second sub-pixel and the third sub-pixel based on a second sub-adjustment mode, re-obtaining measured color coordinates corresponding to the target pixel of which the pixel values of the second sub-pixel and the third sub-pixel are adjusted, determining differences between the re-obtained measured color coordinates and the standard color coordinates, until a difference between a re-obtained measured coordinate in the first direction in the re-obtained measured color coordinates and the standard coordinate in the first direction is not greater than a third threshold, and/or a difference between a re-obtained measured coordinate in the second direction in the re-obtained measured color coordinates and the standard coordinate in the second direction is not greater than the third threshold, and ending the color temperature calibration.

In some embodiments, the third method includes:

- determining whether the difference between the measured coordinate in the first direction and the standard coordinate in the first direction is less than the first threshold;
- if it is determined that the difference between the measured coordinate in the first direction and the standard coordinate in the first direction is not less than the first threshold, increasing the pixel value of the third sub-pixel, re-obtaining a measured coordinate in the first direction corresponding to the target pixel of which the pixel value of the third sub-pixel is adjusted, and determining a difference between the re-obtained measured coordinate in the first direction and the standard coordinate in the first direction, until the difference between the re-obtained measured coordinate in the first direction and the standard coordinate in the first direction is less than the first threshold; and
- if it is determined that the difference between the measured coordinate in the first direction and the standard coordinate in the first direction is less than the first threshold, increasing the pixel value of the second sub-pixel, re-obtaining a measured coordinate in the second direction corresponding to the target pixel of which the pixel value of the second sub-pixel is adjusted, and determining a difference between the re-obtained measured coordinate in the second direction and the standard coordinate in the second direction, until the difference between the re-obtained measured coordinate in the second direction and the standard coordinate in the second direction is less than a second threshold.

In some embodiments, the first threshold is greater than the second threshold, and the target threshold is less than or equal to the second threshold. The color temperature calibration method further includes: if the difference between the re-obtained measured coordinate in the second direction and the standard coordinate in the second direction is less than the second threshold, comparing a measured coordinate in the first direction in a current state with the standard coordinate in the first direction; and if it is determined that a difference between the measured coordinate in the first direction in the current state and the standard coordinate in the first direction is not less than the second threshold, determining whether the measured coordinate in the first direction in the current state is greater than the standard coordinate in the first direction; if it is determined that the measured coordinate in the first direction in the current state is greater than the standard coordinate in the first direction, increasing the pixel value of the third sub-pixel; if it is determined that the measured coordinate in the first direction in the current state is less than the standard coordinate in the first direction, decreasing the pixel value of the third sub-pixel; re-obtaining a measured coordinate in the first direction corresponding to the target pixel of which the pixel value of the third sub-pixel is adjusted, and determining a difference between the re-obtained measured coordinate in the first direction and the standard coordinate in the first direction, until the difference between the re-obtained measured coordinate in the first direction and the standard coordinate in the first direction is less than the second threshold.

In some embodiments, the second threshold is greater than the third threshold, and the target threshold is not less than the third threshold. The color temperature calibration method further includes: if the difference between the measured coordinate in the first direction in the current state and the standard coordinate in the first direction is less than the second threshold, adjusting the pixel values of the second sub-pixel and the third sub-pixel based on a second sub-adjustment mode, re-obtaining measured color coordinates corresponding to the target pixel of which the pixel values of the second sub-pixel and the third sub-pixel are adjusted, determining differences between the re-obtained measured color coordinates and the standard color coordinates, until a difference between a re-obtained measured coordinate in the first direction in the re-obtained measured color coordinates and the standard coordinate in the first direction is not greater than the third threshold, and/or a difference between a re-obtained measured coordinate in the second direction in the re-obtained measured color coordinates and the standard coordinate in the second direction is not greater than the third threshold, and ending the color temperature calibration.

In some embodiments, the second sub-adjustment mode includes:

- if the re-obtained measured coordinate in the first direction is less than the standard coordinate in the first direction, and the re-obtained measured coordinate in the second direction is less than the standard coordinate in the second direction, decreasing the pixel value of the third sub-pixel;
- if the re-obtained measured coordinate in the first direction is less than the standard coordinate in the first direction, and the re-obtained measured coordinate in the second direction is greater than the standard coordinate in the second direction, decreasing the pixel value of the second sub-pixel;
- if the re-obtained measured coordinate in the first direction is greater than the standard coordinate in the first direction, and the re-obtained measured coordinate in the second direction is less than the standard coordinate in the second direction, increasing the pixel value of the second sub-pixel; and if the re-obtained measured coordinate in the first direction is greater than the standard coordinate in the first direction, and the re-obtained measured coordinate in the second direction is greater than the standard coordinate in the second direction, increasing the pixel value of the third sub-pixel.

In another aspect, a color temperature self-calibration system is provided. The color temperature self-calibration system includes a display terminal and a colorimeter. The display terminal includes the display screen, a memory, and one or more processors. The display screen is configured to display the test image. The colorimeter is configured to measure the chromaticity of the target pixel in the display screen, and transmit obtained measured color coordinates of the target pixel to the one or more processors. The memory stores one or more programs, and the one or more processors read the one or more programs stored in the memory to perform the color temperature calibration method as described in the above embodiments.

In yet another aspect, a non-transitory computer-readable storage medium is provided. The computer-readable storage medium stores computer program instructions that, when running in the one or more processors of the color temperature self-calibration system as described in the above embodiments, cause the color temperature self-calibration system to perform one or more steps in the color temperature calibration method as described in any of the above embodiments.

BRIEF DESCRIPTION OF THE DRAWINGS

In order to describe technical solutions in some embodiments of the present disclosure more clearly, accompanying drawings to be used in the description of some embodiments will be introduced briefly below. Obviously, the accompanying drawings to be described below are merely some embodiments of the present disclosure, and a person of ordinary skill in the art can obtain other drawings according to these drawings.

DETAILED DESCRIPTION

Figure 1:
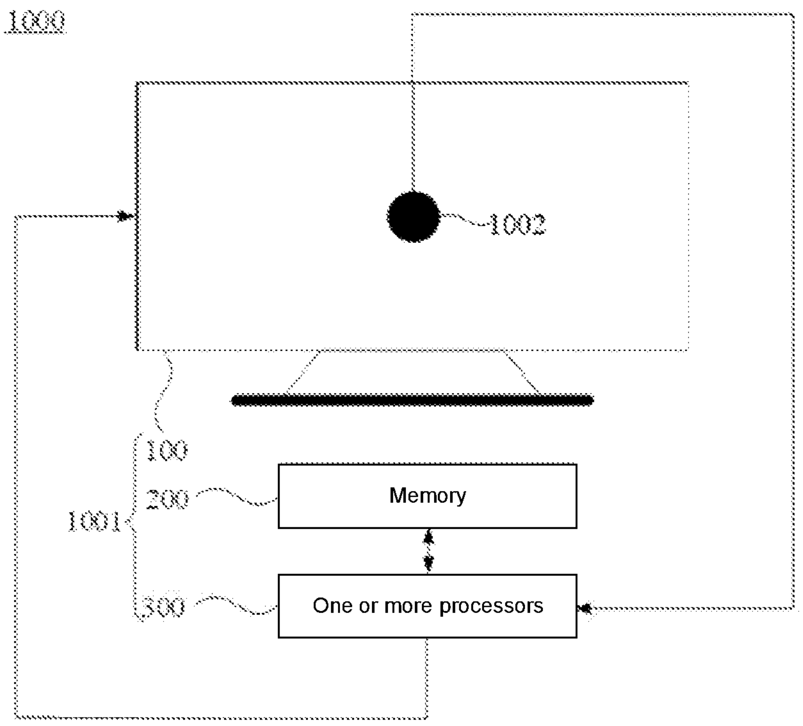
FIG. 1 is a schematic diagram showing a structure of a color temperature self-calibration system, in accordance with embodiments of the present disclosure.

Technical solutions in some embodiments of the present disclosure will be described clearly and completely below with reference to the accompanying drawings in some embodiments of the present disclosure. Obviously, the described embodiments are merely some but not all embodiments of the present disclosure. All other embodiments obtained by a person of ordinary skill in the art based on some embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" and other ordinals are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms such as "coupled" and "connected" and their derivatives may be used. For example, the term "connected" may be used in the description of some embodiments to indicate that two or more components are in direct physical contact or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining" or "in response to detecting", depending on the context.

Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

As used herein, depending on the context, the term "difference" is only used to describe the "absolute value of the difference", and cannot be understood as indicating or implying a positive and negative directional relationship.

The use of the phrase "applicable to" or "configured to" herein means an open and inclusive expression, which does not exclude devices that are applicable to or configured to perform additional tasks or steps.

In addition, the use of the phrase "based on" indicates openness and inclusiveness, since a process, step, calculation or other action that is "based on" one or more of the stated conditions or values may be based on additional conditions or values exceeding those stated in practice.

A standard color temperature of a display screen is usually 6500 K (i.e., D65), and other common color temperatures are 9300 K, 5500 K, 5000 K, etc. In an image quality calibration of a display screen, 6500 K is usually taken as a standard.

The color temperature of the display screen may be reflected by color coordinates of a white image displayed on the display screen. The color coordinates of each pixel in the white image at different color temperatures are shown in Table 1.

TABLE 1

| Color coordinates | 9300 K | 6500 K | 5500 K | 5000 K | 4800 K | 4400 K | 4000 K | 3600 K | 3200 K |
|---|---|---|---|---|---|---|---|---|---|
| x | 0.283 | 0.3127 | 0.3324 | 0.3451 | 0.351 | 0.3644 | 0.3804 | 0.3998 | 0.4234 |
| y | 0.297 | 0.329 | 0.3474 | 0.3516 | 0.3562 | 0.3661 | 0.3768 | 0.3879 | 0.399 |
| z | 0.42 | 0.3583 | 0.3202 | 0.3033 | 0.2928 | 0.2695 | 0.2428 | 0.2123 | 0.1776 |

The color coordinates (x, y, z) include a coordinate x in a first direction, a coordinate y in a second direction, and a coordinate z in a third direction. A sum of the coordinate x in the first direction, the coordinate y in the second direction, and the coordinate z in the third direction is 1, i.e., x+y+z=1. Therefore, if values of the coordinate x in the first direction and the coordinate y in the second direction are determined, the color coordinates (x, y, z) are uniquely determined, and a corresponding color temperature is also uniquely determined.

Based on this, some embodiments of the present disclosure provide a color temperature self-calibration system. As shown in FIG. 1, the color temperature self-calibration system 1000 includes a display terminal 1001 and a colorimeter 1002. The display terminal 1001 includes a display screen 100, a memory 200, and one or more processors 300.

The memory 200 stores one or more programs. By reading one or more programs stored in the memory 200, the processor(s) 300 may control the display screen 100 to display images, control the colorimeter 1002 to measure a chromaticity of an image displayed on the display screen 100, and perform a color temperature calibration method on the display screen 100.

Here, the display terminal 1001 may be any device that is applied to the field of display and displays an image whether in motion (e.g., a video) or stationary (e.g., a still image), and whether literal or graphical. More specifically, it is anticipated that the embodiments may be implemented in a variety of electronic devices, which include, but are not limited to: mobile phones, wireless devices, personal data assistants (PDAs), hand-held or portable computers, global positioning system (GPS) receivers/navigators, cameras, MPEG-4 Part 14 (MP4) video players, video cameras, television monitors, flat panel displays, computer monitors and aesthetic structures (e.g., a display for displaying an image of a piece of jewelry), etc.

The processor(s) 300 may be implemented by one or more application specific integrated circuits (ASICs), digital signal processor(s) (DSP(s)), digital signal processing device(s) (DSPD(s)), programmable logic device(s) (PLD(s)), field programmable gate array(s) (FPGA(s)), controller(s), microcontroller(s), microprocessor(s) or other electronic components.

The memory 200 is configured to store program(s), and may be implemented by any type of volatile or non-volatile storage devices or a combination thereof, such as static random-access memory (SRAM), electrically erasable programmable read-only memory (EEPROM), erasable programmable read-only memory (EPROM), programmable read-only memory (PROM), read-only memory (ROM), magnetic memory or flash memory.

Figure 2:
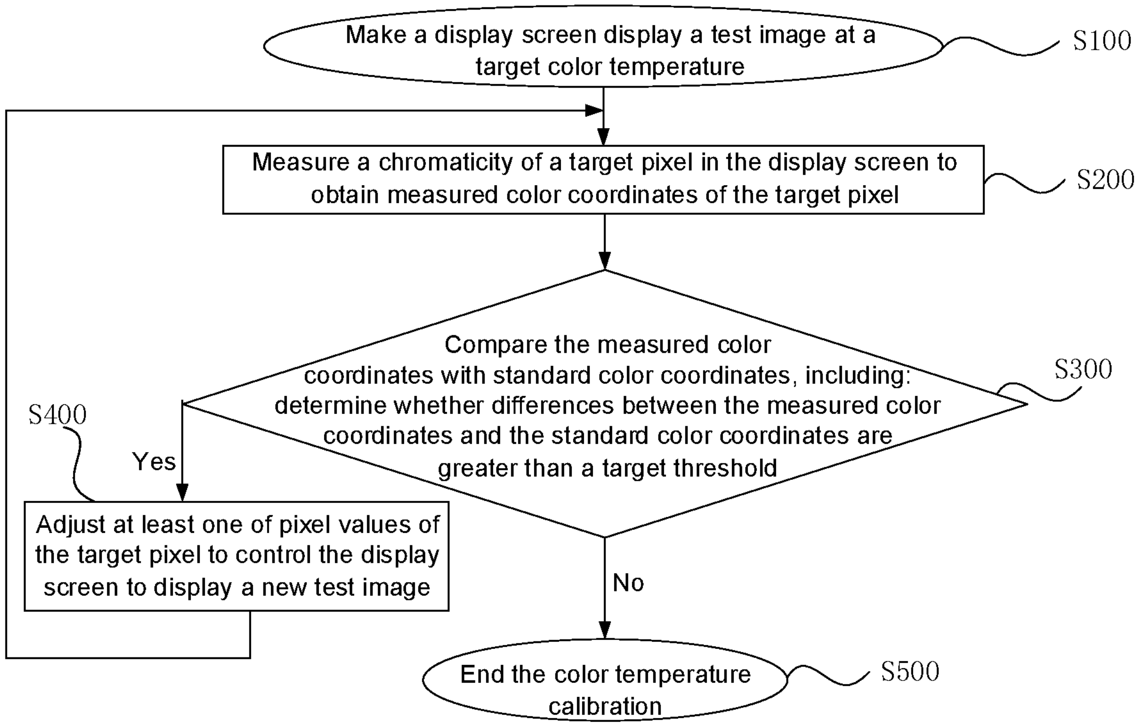
FIG. 2 is a schematic flow diagram showing a color temperature calibration method, in accordance with some embodiments of the present disclosure.

Referring to FIGS. 1 and 2, the color temperature calibration method for the color temperature self-calibration system 1000 includes steps 100 to 500 (S100 to S500).

In S100, a display screen is made to display a test image at a target color temperature.

The processor(s) 300 controls the display screen 100 to display the test image. The test image may be selected according to actual needs. For example, the test image is a white image, or the test image includes a set of gray scale images with different gray scale values.

Optionally, the target color temperature is 6500K.

In S200, a chromaticity of a target pixel in the display screen is measured to obtain measured color coordinates of the target pixel.

The processor 300 controls the colorimeter 1002 to measure the chromaticity of the target pixel in the display screen. The colorimeter 1002 obtains the measured color coordinates of the target pixel and then may transmit the measured color coordinates of the target pixel to the processor 300, so that the processor 300 performs data processing.

In S300, the measured color coordinates are compared with standard color coordinates.

Here, the standard color coordinates are color coordinates of the target pixel when it is in an ideal state at the target color temperature. Optionally, the test image is the white image, and the standard color coordinates of the target pixel at the target color temperature are shown in Table 1.

The measured color coordinates are compared with the standard color coordinates, which includes, but is not limited to: determining whether differences between the measured color coordinates and the standard color coordinates are greater than a target threshold. The target threshold may be set according to actual needs. For example, the target threshold is 0.01, 0.005 or 0.003.

It will be added that, the standard color coordinates include a standard coordinate $x_0$ in the first direction, and a standard coordinate $y_0$ in the second direction. The measured color coordinates include a measured coordinate $x_1$ in the first direction and a measured coordinate $y_1$ in the second direction. The description that the differences between the measured color coordinates and the standard color coordinates are greater than the target threshold includes that: a difference between the measured coordinate $x_1$ in the first direction and the standard coordinate $x_0$ in the first direction is greater than the target threshold, and a difference between the measured coordinate $y_1$ in the second direction and the standard coordinate $y_0$ in the second direction is greater than the target threshold. In an example where the target threshold is 0.01, the description that the differences between the measured color coordinates and the standard color coordinates are greater than the target threshold value means that: $|x_1-x_0|>0.01$, and $|y_1-y_0|>0.01$. In the embodiments of the present disclosure, the coordinates (x, y) in two directions in the color coordinates (x, y, z) are compared, which simplifies the steps of color temperature calibration as compared with a solution in which the coordinates in three directions in the color coordinates are compared.

In S400, if the differences between the measured color coordinates and the standard color coordinates are greater than the target threshold, at least one of pixel values of the target pixel is adjusted to control the display screen to display a new test image. Then, S200 and S300 are re-performed.

The pixel values of the target pixel are values assigned by the processor 300 when the image is digitized, and the pixel values of the target pixel represent an average brightness of the target pixel. It can be understood that, the display screen 100 usually adopt an RGB color mode for display. The target pixel includes a first sub-pixel, a second sub-pixel, and a third sub-pixel of different colors. The first sub-pixel is a red sub-pixel (R), the second sub-pixel is a green sub-pixel (G), and the third sub-pixel is a blue sub-pixel (B). The color display of the target pixel meets the requirements of CIE1931 color space and sRGB color space.

Figure 3:
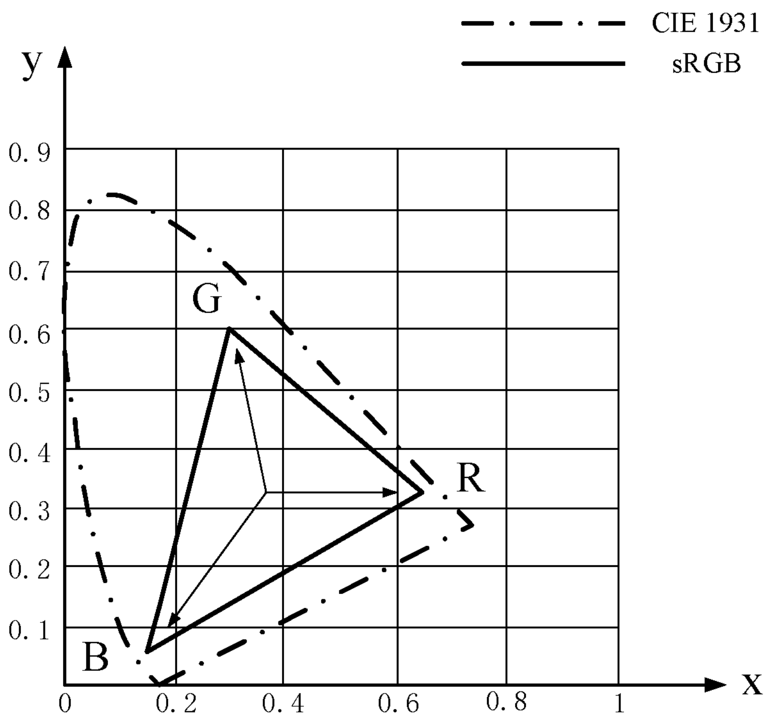
FIG. 3 is a schematic diagram showing a corresponding relationship between a color space and color coordinates, in accordance with some embodiments of the present disclosure.

A corresponding relationship between the color coordinates (x, y) and each of the CIE1931 color space and the sRGB color space is shown in FIG. 3. Based on this, adjusting the at least one of the pixel values of the target pixel includes adjusting pixel value(s) of at least one of the sub-pixels (R, G and B) in the target pixel. In this way, by adjusting at least one of a pixel value of the first sub-pixel (R), a pixel value of the second sub-pixel (G), and a pixel value of the third sub-pixel (B), it may be possible to change the color coordinates (x, y) of the target pixel corresponding to the image displayed by the display screen 100. The changes of the color coordinates (x, y) when the pixel values of the sub-pixels of different colors are adjusted are shown in Table 2.

TABLE 2

| | x | y | | x | y |
|---|---|---|---|---|---|
| R− | ↓ | ↑ | R+ | ↑ | ↓ |
| G− | ↑ | ↓ | G+ | ↓ | ↑ |
| B− | ↑ | ↑ | B+ | ↓ | ↓ |

Referring to FIG. 3 and Table 2, if the pixel value of the first sub-pixel R in the target pixel is decreased (R−), the coordinate x in the first direction will decrease (↓), and the coordinate y in the second direction will increase (↑); if the pixel value of the first sub-pixel R in the target pixel is increased (R+), the coordinate x in the first direction will increase (↑), and the coordinate y in the second direction will decrease (↓), if the pixel value of the second sub-pixel G in the target pixel is decreased (G−), the coordinate x in the first direction will increase (↑), and the coordinate y in the second direction will decrease (↓), if the pixel value of the second sub-pixel G in the target pixel is increased (G+), the coordinate x in the first direction will decrease (↓), and the coordinate y in the second direction will increase (↑), if the pixel value of the third sub-pixel B in the target pixel is decreased (B−), the coordinate x in the first direction will increase (↑), and the coordinate y in the second direction will increase (↑); and if the pixel value of the third sub-pixel B in the target pixel is increased (B+), the coordinate x in the first direction will decrease (↓), and the coordinate y in the second direction will decrease (↓).

After the measured color coordinates are compared with the standard color coordinates, by adjusting the pixel value (s) of the target pixel continuously according to the above rules, and by measuring the chromaticity of the target pixel in real time, it may be possible to gradually calibrate the color coordinates of the target pixel and thus calibrate the color temperature of the display screen 100.

If the differences between the measured color coordinates and the standard color coordinates are not greater than the target threshold, S500 is performed. In S500, the color temperature calibration is ended.

In the embodiments of the present disclosure, the processor 300 controls the display screen 100 to display the test image at the target color temperature, then controls the colorimeter 1002 to measure the chromaticity of the target pixel in the display screen; and the colorimeter 1002 obtains the measured color coordinates $(x_1, y_1)$ of the target pixel, and transmits the measured color coordinates $(x_1, y_1)$ to the processor 300. In this way, by comparing the measured color coordinates $(x_1, y_1)$ of the target pixel with the standard color coordinates $(x_0, y_0)$, it may be possible to determine whether the color temperature of the display screen 100 needs to be calibrated according to whether the differences between the measured color coordinates and the standard color coordinates are greater than the target threshold.

Based on this, in a case where the differences between the measured color coordinates $(x_1, y_1)$ and the standard color coordinates $(x_0, y_0)$ are greater than the target threshold, the pixel value(s) of the target pixel are adjusted, so that the display screen 100 updates the displayed image. Then, the chromaticity of the target pixel corresponding to the updated image is re-measured, and re-obtained measured color coordinates $(x_1, y_1)$ and the standard color coordinates $(x_0, y_0)$ are compared. In this way, S200 to S400 are performed repeatedly, until the differences between the measured color coordinates $(x_1, y_1)$ and the standard color coordinates $(x_0, y_0)$ are not greater than the target threshold, thereby effectively achieving the calibration of the color temperature of the display screen 100.

In the embodiments of the present disclosure, the calibration of the color temperature of the display screen 100 may be performed by the processor(s) 300 before the display terminal 1001 leaves factory, or the calibration of the color temperature of the display screen 100 may be performed by the processor(s) 300 according to a preset time period or a calibration instruction at a certain moment after the display terminal 1001 leaves factory.

In addition, in the embodiments of the present disclosure, the color temperature calibration of the display screen 100 is performed by the processor(s) 300 according to real-time feedback of the colorimeter 1002 on the measured color coordinates ($x_1$, $y_1$) of the target pixel. In this way, the color temperature self-calibration system 1000 provided in the embodiments of the present disclosure may have a faster calibration speed and higher calibration accuracy than manual calibration. In addition, the smaller the target threshold, the higher the accuracy of the color temperature calibration of the display screen 100.

It is worth mentioning that, in the color temperature self-calibration system 1000, the one or more processors 300 may be integrated with the memory 200, or the one or more processors 300 and the memory 200 may be arranged independently, or the one or more processors 300 may adopt other structures. This is not limited in the embodiments of the present disclosure.

Figure 4:
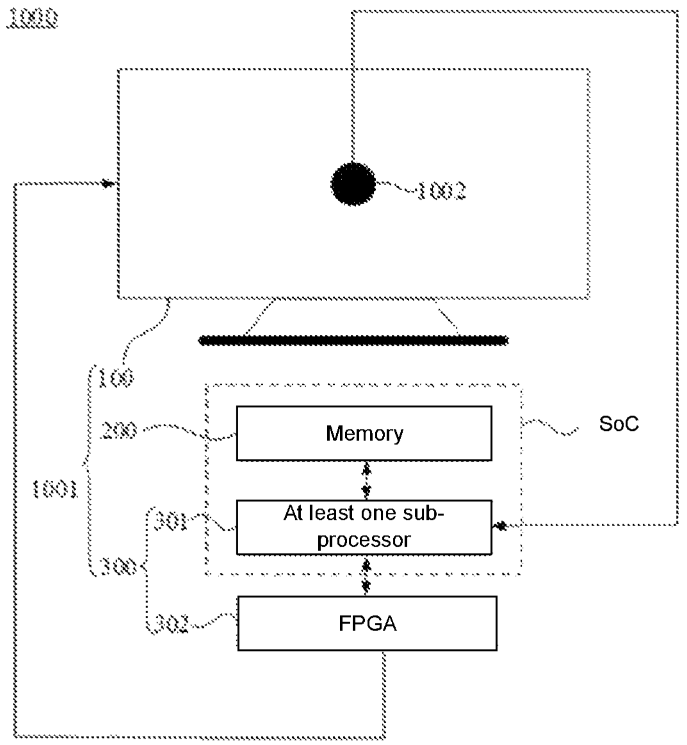
FIG. 4 is a schematic diagram showing a structure of another color temperature self-calibration system, in accordance with embodiments of the present disclosure.

Optionally, as shown in FIG. 4, the display terminal 1001 includes a system-on-chip (SoC). The SoC refers to a complete system integrated in a single chip. The system includes at least a central processing unit (CPU), a memory, and peripheral circuits. The system is, for example, a Linux system. The processors 300 in the color temperature self-calibration system 1000 include a field programmable gate array (FPGA) 302 and at least one sub-processor 301 integrated in the SoC. The memory 200 is also integrated in the SoC. In this way, it is conducive to reducing the power consumption of the color temperature self-calibration system 1000.

The at least one sub-processor 301 in the SoC is coupled to the colorimeter 1002 and the FPGA 302. The colorimeter 1002 is, for example, a CA-410 color analyzer. The colorimeter 1002 may be coupled to the sub-processor(s) 301 in the SoC through a universal serial bus (USB) interface or a local area network (LAN) port. The sub-processor(s) 301 can receive the measured color coordinates ($x_1$, $y_1$) of the target pixel transmitted by the colorimeter 1002, determine a pixel value adjustment amount of the target pixel according to the measured color coordinates ($x_1$, $y_1$), and transmit adjusted pixel values of the target pixel to the FPGA 302. The FPGA 302 is coupled to the display screen 100, and may drive the display screen 100 to display an image according to the adjusted pixel values of the target pixel.

Optionally, the SoC, FPGA 302 and the display screen 100 are integrated together.

The structure of the color temperature self-calibration system 1000 is as described in the above embodiments. When the color temperature self-calibration system 1000 performs the color temperature calibration method, adjusting the at least one of the pixel values of the target pixel in S400 includes: adjusting at least one of the pixel value of the first sub-pixel (R), the pixel value of the second sub-pixel (G) and the pixel value of the third sub-pixel (B) according to which of the measured coordinate $x_1$ in the first direction and the standard coordinate $x_0$ in the first direction is greater, and which of the measured coordinate $y_1$ in the second direction and the standard coordinate $y_0$ in the second direction is greater.

Figure 5:
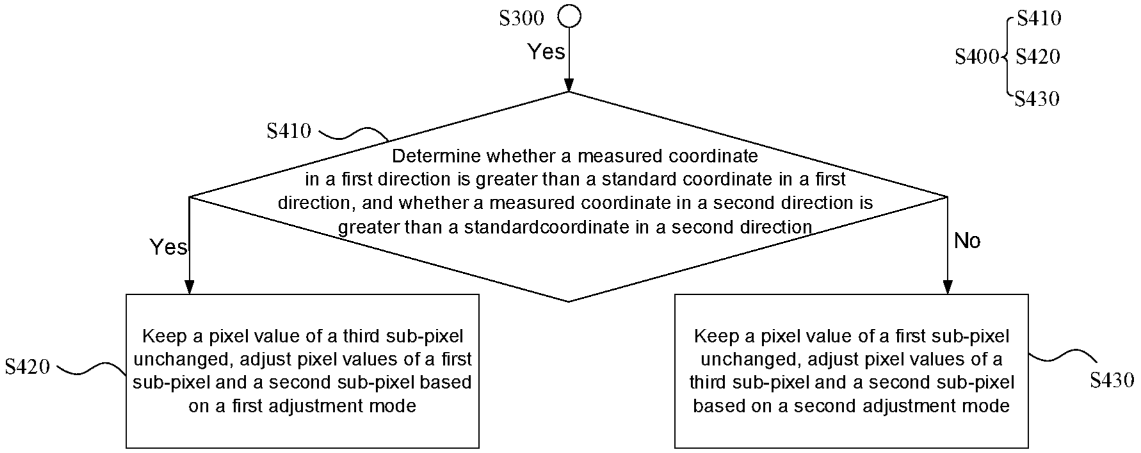
FIG. 5 is a schematic flow diagram showing corresponding steps performed in S400, in accordance with some embodiments of the present disclosure.

In some embodiments, as shown in FIG. 5, adjusting the at least one of the pixel values of the target pixel in S400 includes steps 410 to 430 (S410 to S430).

In S410, it is determined whether the measured coordinate $x_1$ in the first direction is greater than the standard coordinate $x_0$ in the first direction, and whether the measured coordinate $y_1$ in the second direction is greater than the standard coordinate $y_0$ in the second direction.

In S420, if it is determined that the measured coordinate $x_1$ in the first direction is greater than the standard coordinate $x_0$ in the first direction, and the measured coordinate $y_1$ in the second direction is greater than the standard coordinate $y_0$ in the second direction, the pixel value of the third sub-pixel (B) is kept unchanged, and pixel values of the first sub-pixel (R) and the second sub-pixel (G) are adjusted based on a first adjustment mode.

In S430, if it is determined that the measured coordinate $x_1$ in the first direction is not greater than the standard coordinate $x_0$ in the first direction, and/or the measured coordinate $y_1$ in the second direction is not greater than the standard coordinate $y_0$ in the second direction, the pixel value of the first sub-pixel (R) is kept unchanged, and pixel values of the third sub-pixel (B) and the second sub-pixel (G) are adjusted based on a second adjustment mode.

The first adjustment mode and the second adjustment mode may be set according to actual needs.

Figure 6A:
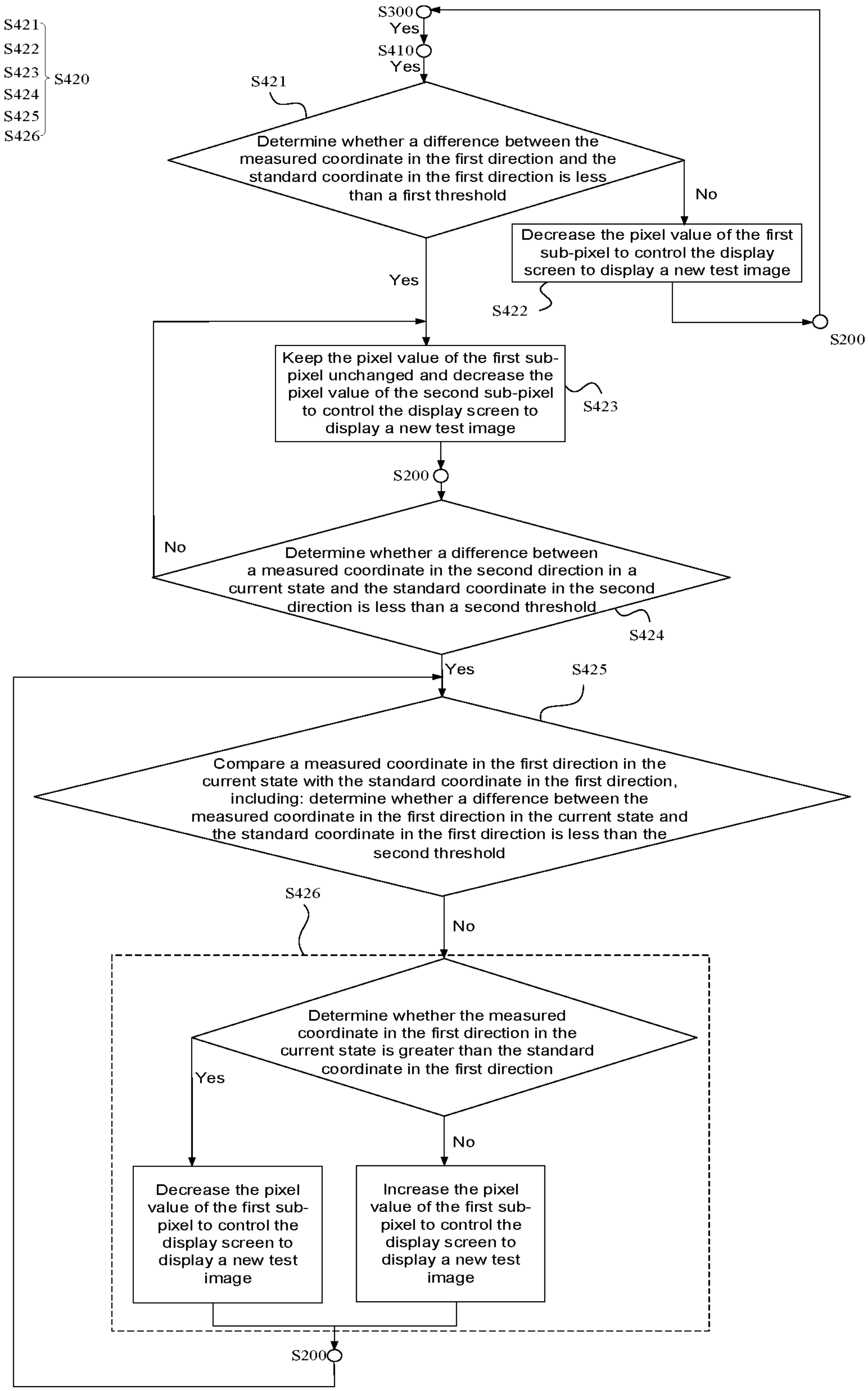
FIGS. 6A and 6B are schematic flow diagrams showing corresponding steps performed in S420, in accordance with some embodiments of the present disclosure.
Figure 6B:
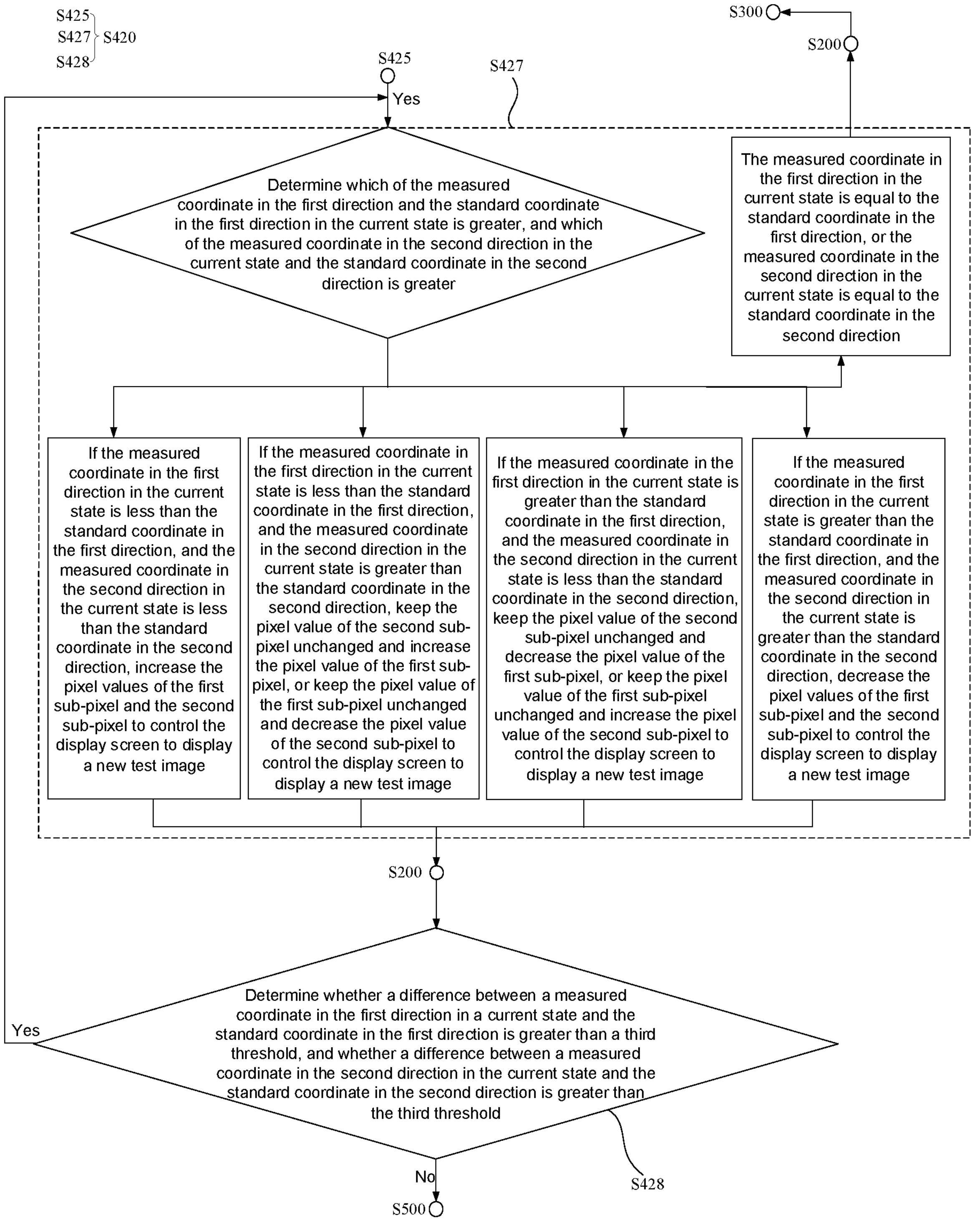
Figure 7:
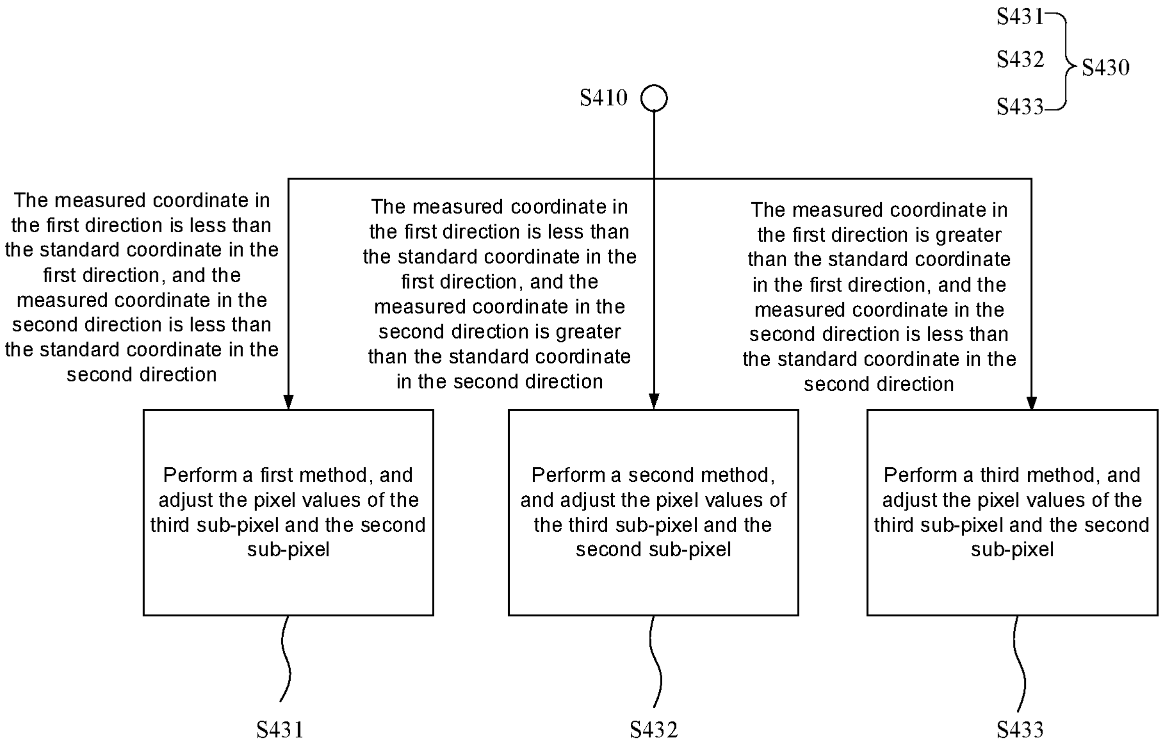
FIG. 7 is a schematic flow diagram showing corresponding steps performed in S430, in accordance with some embodiments of the present disclosure.

Optionally, as shown in FIGS. 6A and 6B, adjusting the pixel values of the first sub-pixel (R) and the second sub-pixel (G) based on the first adjustment mode includes steps 421 to 428 (S421 to S428). In the following embodiments, a first threshold $T_1$ is greater than a second threshold $T_2$, and the second threshold $T_2$ is greater than a third threshold $T_3$; the target threshold $T_0$ is less than or equal to the second threshold $T_2$, and the target threshold $T_0$ is not less than the third threshold $T_3$.

In S421, it is determined whether the difference between the measured coordinate $x_1$ in the first direction and the standard coordinate $x_0$ in the first direction is less than the first threshold $T_1$, that is, whether $|x_1-x_0|<T_1$.

In S422, if it is determined that the difference between the measured coordinate $x_1$ in the first direction and the standard coordinate $x_0$ in the first direction is not less than the first threshold $T_1$, the pixel value of the first sub-pixel (R) is decreased to control the display screen 100 to display a new test image. Then, S200, S300, and S410 are re-performed, until a difference between a re-obtained measured coordinate $x_1$ in the first direction and the standard coordinate $x_0$ in the first direction is less than the first threshold $T_1$.

In S423, if it is determined that the difference between the measured coordinate $x_1$ in the first direction and the standard coordinate $x_0$ in the first direction is less than the first threshold $T_1$, the pixel value of the first sub-pixel (R) is kept unchanged, the pixel value of the second sub-pixel (G) is decreased to control the display screen 100 to display a new test image. Then, S200 and S424 are performed.

In S424, it is determined whether a difference between a measured coordinate $y_1$ in the second direction in a current state (i.e., a measured coordinate $y_1$ in the second direction of the target pixel corresponding to a currently displayed test image) and the standard coordinate $y_0$ in the second direction is less than the second threshold $T_2$, that is, whether $|y_1-y_0|<T_2$.

If it is determined that the difference between the measured coordinate $y_1$ in the second direction in the current state and the standard coordinate $y_0$ in the second direction is not less than the second threshold $T_2$, S423, S200 and S424 are performed again, until a difference between a re-obtained measured coordinate $y_1$ in the second direction and the standard coordinate $y_0$ in the second direction is less than the second threshold $T_2$.

If it is determined that the difference between the measured coordinate $y_1$ in the second direction in the current state and the standard coordinate $y_0$ in the second direction is less than the second threshold $T_2$, S425 is performed.

In S425, a measured coordinate $x_1$ in the first direction in the current state (i.e., a measured coordinate $x_1$ in the first direction of the target pixel corresponding to the currently displayed test image) and the standard coordinate $x_0$ in the first direction are compared. For example, comparing the measured coordinate $x_1$ in the first direction in the current state and the standard coordinate $x_0$ in the first direction, includes, but is not limited to: determining whether a difference between the measured coordinate $x_1$ in the first direction in the current state and the standard coordinate $x_0$ in the first direction is less than the second threshold $T_2$, that is, whether $|x_1-x_0|<T_2$.

If it is determined that the difference between the measured coordinate $x_1$ in the first direction in the current state and the standard coordinate $x_0$ in the first direction is not less than the second threshold $T_2$, S426 is performed. If it is determined that the difference between the measured coordinate $x_1$ in the first direction in the current state and the standard coordinate $x_0$ in the first direction is less than the second threshold $T_2$, S427 is performed.

In S426, the pixel value of the first sub-pixel (R) is adjusted according to which of the measured coordinate $x_1$ in the first direction in the current state and the standard coordinate $x_0$ in the first direction is greater.

For example, adjusting the pixel value of the first sub-pixel (R) according to which of the measured coordinate $x_1$ in the first direction in the current state and the standard coordinate $x_0$ in the first direction is greater includes following steps.

It is determined whether the measured coordinate $x_1$ in the first direction in the current state is greater than the standard coordinate $x_0$ in the first direction.

If it is determined that the measured coordinate $x_1$ in the first direction in the current state is greater than the standard coordinate $x_0$ in the first direction ($x_1>x_0$), the pixel value of the first sub-pixel (R) is decreased to control the display screen 100 to display a new test image. And then, S200 and S425 are re-performed, until a difference between a re-obtained measured coordinate $x_1$ in the first direction and the standard coordinate $x_0$ in the first direction is less than the second threshold $T_2$.

If it is determined that the measured coordinate $x_1$ in the first direction in the current state is less than the standard coordinate $x_0$ in the first direction ($x_1<x_0$), the pixel value of the first sub-pixel (R) is increased to control the display screen 100 to display a new test image. And then, S200 and S425 are re-performed, until a difference between a re-obtained measured coordinate $x_1$ in the first direction and the standard coordinate $x_0$ in the first direction is less than the second threshold $T_2$.

In S427, it is determined which of the measured coordinate $x_1$ in the first direction in the current state and the standard coordinate $x_0$ in the first direction is greater, and which of the measured coordinate $y_1$ in the second direction in the current state and the standard coordinate $y_0$ in the second direction is greater, and the pixel values of the first sub-pixel (R) and the second sub-pixel (G) are adjusted based on a first sub-adjustment mode.

With continued reference to FIGS. 6A and 6B, the first sub-adjustment mode includes the following five cases.

In a first case, the measured coordinate $x_1$ in the first direction in the current state is less than the standard coordinate $x_0$ in the first direction, and the measured coordinate $y_1$ in the second direction in the current state is less than the standard coordinate $y_0$ in the second direction (that is, $x_1<x_0$ and $y_1<y_0$), the pixel values of the first sub-pixel (R) and the second sub-pixel (G) are both increased to control the display screen 100 to display a new test image. Then, S200 and S428 are performed.

In a second case, the measured coordinate $x_1$ in the first direction in the current state is less than the standard coordinate $x_0$ in the first direction, and the measured coordinate $y_1$ in the second direction in the current state is greater than the standard coordinate $y_0$ in the second direction (that is, $x_1<x_0$ and $y_1>y_0$); the pixel value of the first sub-pixel (R) is increased and the pixel value of the second sub-pixel (G) is kept unchanged, or the pixel value of the first sub-pixel (R) is kept unchanged, and the pixel value of the second sub-pixel (G) is decreased to control the display screen 100 to display a new test image. Then, S200 and S428 are performed.

In a third case, the measured coordinate $x_1$ in the first direction in the current state is greater than the standard coordinate $x_0$ in the first direction, and the measured coordinate $y_1$ in the second direction in the current state is less than the standard coordinate $y_0$ in the second direction (that is, $x_1>x_0$ and $y_1<y_0$), the pixel value of the first sub-pixel (R) is decreased and the pixel value of the second sub-pixel (G) is kept unchanged, or the pixel value of the first sub-pixel (R) is kept unchanged and the pixel value of the second sub-pixel (G) is increased to control the display screen 100 to display a new test image. Then, S200 and S428 are performed.

In a fourth case, the measured coordinate $x_1$ in the first direction in the current state is greater than the standard coordinate $x_0$ in the first direction, and the measured coordinate $y_1$ in the second direction in the current state is greater than the standard coordinate $y_0$ in the second direction (that is, $x_1>x_0$ and $y_1>y_0$); the pixel values of the first sub-pixel (R) and the second sub-pixel (G) are both decreased to control the display screen 100 to display a new test image. Then, S200 and S428 are performed.

In a fifth case, the measured coordinate $x_1$ in the first direction in the current state is equal to the standard coordinate $x_0$ in the first direction, or the measured coordinate $y_1$ in the second direction in the current state is equal to the standard coordinate $y_0$ in the second direction (that is, $x_1=x_0$ or $y_1=y_0$); and then, S200 and S300 are performed.

In S428, it is determined whether a difference between a measured coordinate $x_1$ in the first direction in a current state (i.e., a measured coordinate $x_1$ in the first direction of the target pixel corresponding to a currently displayed test image) and the standard coordinate $x_0$ in the first direction is greater than the third threshold $T_3$, and whether a difference between a measured coordinate $y_1$ in the second direction in the current state (i.e., a measured coordinate $y_1$ in the second direction of the target pixel corresponding to a currently displayed test image) and the standard coordinate $y_0$ in the second direction is greater than the third threshold $T_3$.

If it is determined that the difference between the measured coordinate $x_1$ in the first direction in the current state and the standard coordinate $x_0$ in the first direction is greater than the third threshold $T_3$, and the difference between the measured coordinate $y_1$ in the second direction in the current state and the standard coordinate $y_0$ in the second direction is greater than the third threshold $T_3$ (that is, $|x_1-x_0|>T_3$ and $|y_1-y_0|>T_3$), then S427 is performed.

If it is determined that the difference between the measured coordinate $x_1$ in the first direction in the current state and the standard coordinate $x_0$ in the first direction is not greater than the third threshold $T_3$, and/or the difference between the measured coordinate $y_1$ in the second direction in the current state and the standard coordinate $y_0$ in the second direction is not greater than the third threshold $T_3$ (that is, $|x_1-x_0|\leq T_3$ and/or $|y_1-y_0|T_3$), then S500 is performed and the color temperature calibration is ended.

In the above embodiments, the first threshold $T_1$ is greater than the second threshold $T_2$, and the second threshold $T_2$ is greater than the third threshold $T_3$; the target threshold $T_0$ is less than or equal to the second threshold $T_2$, and the target threshold $T_0$ is not less than the third threshold $T_3$.

Optionally, as shown in FIGS. 7 to 10B, adjusting the pixel value of the second sub-pixel (G) and the pixel value of the third sub-pixel (B) based on the second adjustment mode includes steps 431 to 433 (S431 to S433). In the following embodiments, the first threshold $T_1$ is greater than the second threshold $T_2$, and the second threshold $T_2$ is greater than the third threshold $T_3$; the target threshold $T_0$ is less than or equal to the second threshold $T_2$, and the target threshold $T_0$ is not less than the third threshold $T_3$.

In S431, if the measured coordinate $x_1$ in the first direction is less than the standard coordinate $x_0$ in the first direction, and the measured coordinate $y_1$ in the second direction is less than the standard coordinate $y_0$ in the second direction, a first method is performed, so as to adjust the pixel values of the third sub-pixel (B) and the second sub-pixel (G).

Figure 8A:
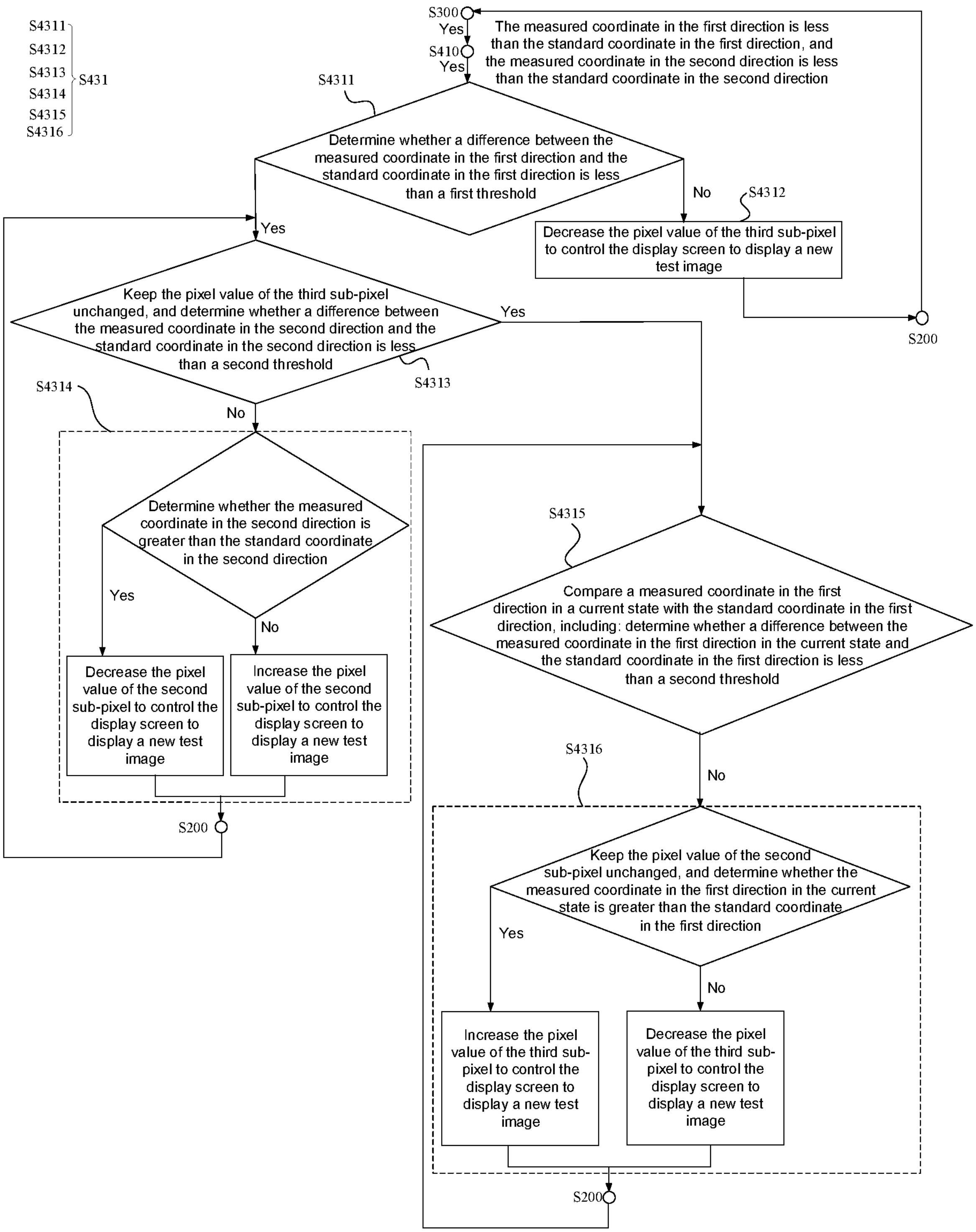
FIGS. 8A and 8B are schematic flow diagrams showing corresponding steps performed in S431, in accordance with some embodiments of the present disclosure.
Figure 8B:
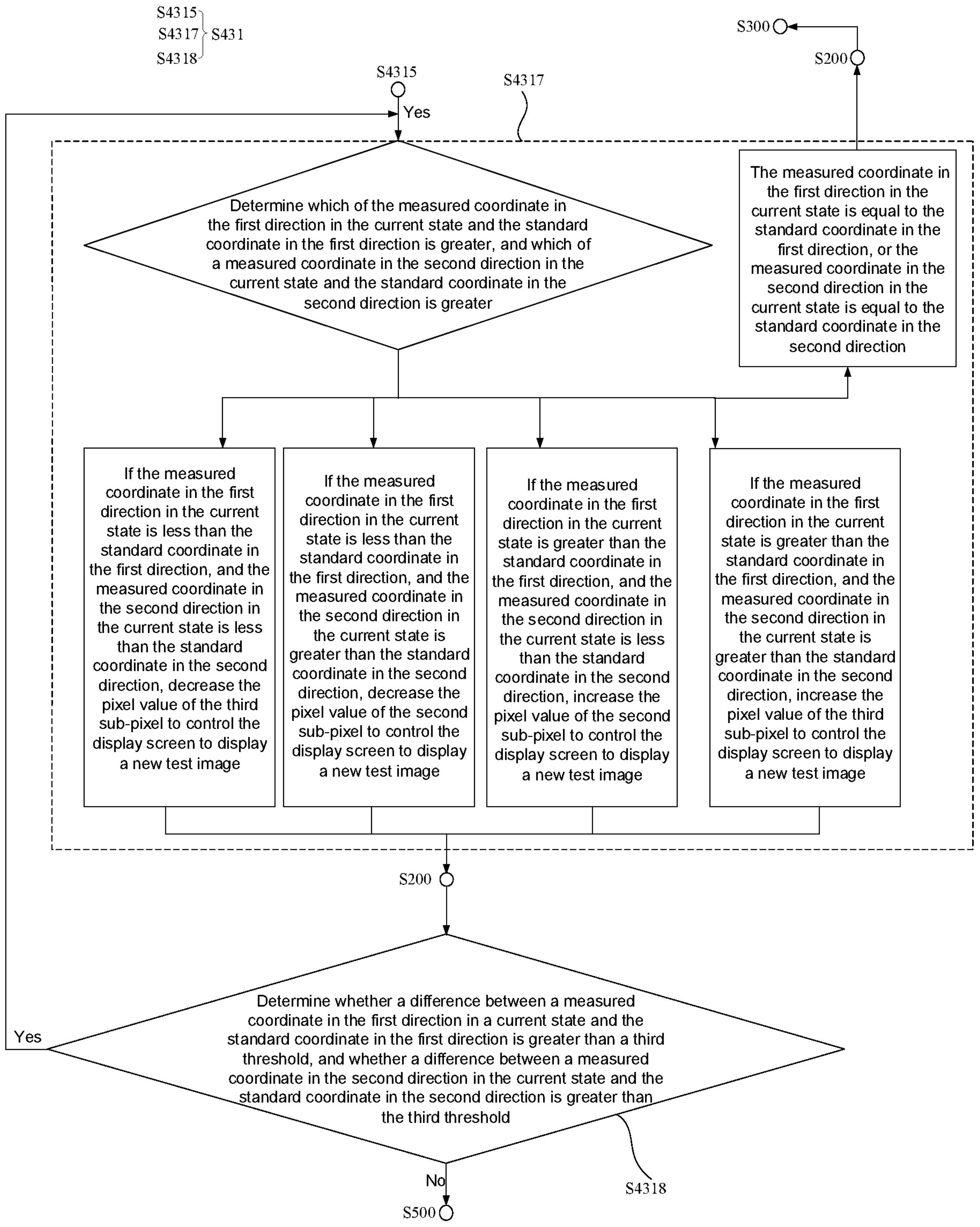

Here, as shown in FIGS. 8A and 8B, the first method includes, but is not limited to steps 4311 to 4318 (S4311 to S4318).

In S4311, it is determined whether the difference between the measured coordinate $x_1$ in the first direction and the standard coordinate $x_0$ in the first direction is less than the first threshold $T_1$, that is, whether $|x_1-x_0|<T_1$.

In S4312, if it is determined that the difference between the measured coordinate $x_1$ in the first direction and the standard coordinate $x_0$ in the first direction is not less than the first threshold $T_1$, the pixel value of the third sub-pixel (B) is decreased to control the display screen 100 to display a new test image. Then, S200, S300, and S410 are re-performed, until a difference between a re-obtained measured coordinate $x_1$ in the first direction and the standard coordinate $x_0$ in the first direction is less than the first threshold T=.

In S4313, if it is determined that the difference between the measured coordinate $x_1$ in the first direction and the standard coordinate $x_0$ in the first direction is less than the first threshold $T_1$, the pixel value of the third sub-pixel (B) is kept unchanged, and it is determined whether the difference between the measured coordinate $y_1$ in the second direction and the standard coordinate $y_0$ in the second direction is less than the second threshold $T_2$, that is, whether $|y_1-y_0|<T_2$.

If it is determined that the difference between the measured coordinate $y_1$ in the second direction and the standard coordinate $y_0$ in the second direction is not less than the second threshold $T_2$, S4314 is performed. If it is determined that the difference between the measured coordinate $y_1$ in the second direction and the standard coordinate $y_0$ in the second direction is less than the second threshold $T_2$, S4315 is performed.

In S4314, the pixel value of the second sub-pixel (G) is adjusted according to which of the measured coordinate $y_1$ in the second direction and the standard coordinate $y_0$ in the second direction is greater.

For example, it is determined whether the measured coordinate $y_1$ in the second direction is greater than the standard coordinate $y_0$ in the second direction.

If it is determined that the measured coordinate $y_1$ in the second direction is greater than the standard coordinate $y_0$ in the second direction ($y_1>y_0$), the pixel value of the second sub-pixel (G) is decreased to control the display screen 100 to display a new test image. Then, S200 and S4313 are performed, until a difference between a re-obtained measured coordinate $y_1$ in the second direction and the standard coordinate $y_0$ in the second direction is less than the second threshold $T_2$.

If it is determined that the measured coordinate $y_1$ in the second direction is less than the standard coordinate $y_0$ in the second direction ($y_1<y_0$), the pixel value of the second sub-pixel (G) is increased to control the display screen 100 to display a new test image. Then, S200 and S4313 are performed, until a difference between a re-obtained measured coordinate $y_1$ in the second direction and the standard coordinate $y_0$ in the second direction is less than the second threshold $T_2$.

In S4315, a measured coordinate $x_1$ in the first direction in a current state (i.e., a measured coordinate $x_1$ in the first direction of the target pixel corresponding to a currently displayed test image) and the standard coordinate $x_0$ in the first direction are compared. For example, comparing the measured coordinate $x_1$ in the first direction in the current state and the standard coordinate $x_0$ in the first direction, includes, but is not limited to: determining whether a difference between the measured coordinate $x_1$ in the first direction in the current state and the standard coordinate $x_0$ in the first direction is less than the second threshold $T_2$, that is, whether $|x_1-x_0|<T_2$.

If it is determined that the difference between the measured coordinate $x_1$ in the first direction in the current state and the standard coordinate $x_0$ in the first direction is not less than the second threshold $T_2$, S4316 is performed. If it is determined that the difference between the measured coordinate $x_1$ in the first direction in the current state and the standard coordinate $x_0$ in the first direction is less than the second threshold $T_2$, S4317 is performed.

In S4316, the pixel value of the second sub-pixel (G) is kept unchanged, and the pixel value of the third sub-pixel (B) is adjusted, according to which of the measured coordinate $x_1$ in the first direction in the current state and the standard coordinate $x_0$ in the first direction is greater.

For example, adjusting the pixel value of the third sub-pixel (B) according to which of the measured coordinate $x_1$ in the first direction in the current state and the standard coordinate $x_0$ in the first direction is greater includes following steps.

It is determined whether the measured coordinate $x_1$ in the first direction in the current state is greater than the standard coordinate $x_0$ in the first direction.

If it is determined that the measured coordinate $x_1$ in the first direction in the current state is greater than the standard coordinate $x_0$ in the first direction ($x_1>x_0$), the pixel value of the third sub-pixel (B) is increased to control the display screen 100 to display a new test image. Then, S200 and S4315 are performed, until a difference between a re-obtained measured coordinate $x_1$ in the first direction and the standard coordinate $x_0$ in the first direction is less than the second threshold $T_2$.

If it is determined that the measured coordinate $x_1$ in the first direction in the current state is less than the standard coordinate $x_0$ in the first direction ($x_1<x_0$), the pixel value of the third sub-pixel (B) is decreased to control the display screen 100 to display a new test image. Then, S200 and S4315 are performed, until a difference between a re-obtained measured coordinate $x_1$ in the first direction and the standard coordinate $x_0$ in the first direction is less than the second threshold $T_2$.

In S4317, it is determined which of the measured coordinate $x_1$ in the first direction in the current state and the standard coordinate $x_0$ in the first direction is greater, and which of a measured coordinate $y_1$ in the second direction in the current state (i.e., a measured coordinate $y_1$ in the second direction of the target pixel corresponding to the currently displayed test image) and the standard coordinate $y_0$ in the second direction is greater, and the pixel values of the third sub-pixel (B) and the second sub-pixel (G) are adjusted based on a second sub-adjustment mode.

With continued reference to FIGS. 8A and 8B, the second sub-adjustment mode includes the following five cases.

In a first case, the measured coordinate $x_1$ in the first direction in the current state is less than the standard coordinate $x_0$ in the first direction, and the measured coordinate $y_1$ in the second direction in the current state is less than the standard coordinate $y_0$ in the second direction (that is, $x_1<x_0$ and $y_1<y_0$), the pixel value of the third sub-pixel (B) is decreased to control the display screen 100 to display a new test image. Then, S200 and S4318 are performed.

In a second case, the measured coordinate $x_1$ in the first direction in the current state is less than the standard coordinate $x_0$ in the first direction, and the measured coordinate $y_1$ in the second direction in the current state is greater than the standard coordinate $y_0$ in the second direction (that is, $x_1<x_0$ and $y_1>y_0$); the pixel value of the second sub-pixel (G) is decreased to control the display screen 100 to display a new test image. Then, S200 and S4318 are performed.

In a third case, the measured coordinate $x_1$ in the first direction in the current state is greater than the standard coordinate $x_0$ in the first direction, and the measured coordinate $y_1$ in the second direction in the current state is less than the standard coordinate $y_0$ in the second direction (that is, $x_1>x_0$ and $y_1<y_0$); the pixel value of the second sub-pixel (G) is increased to control the display screen 100 to display a new test image. Then, S200 and S4318 are performed.

In a fourth case, the measured coordinate $x_1$ in the first direction in the current state is greater than the standard coordinate $x_0$ in the first direction, and the measured coordinate $y_1$ in the second direction in the current state is greater than the standard coordinate $y_0$ in the second direction (that is, $x_1>x_0$ and $y_1>y_0$); the pixel value of the third sub-pixel (B) is increased to control the display screen 100 to display a new test image. Then, S200 and S4318 are performed.

In a fifth case, the measured coordinate $x_1$ in the first direction in the current state is equal to the standard coordinate $x_0$ in the first direction, or the measured coordinate $y_1$ in the second direction in the current state is equal to the standard coordinate $y_0$ in the second direction (that is, $x_1=x_0$ or $y_1=y_0$); and then, S200 and S300 are performed.

In S4318, it is determined whether a difference between a measured coordinate $x_1$ in the first direction in a current state (i.e., a measured coordinate $x_1$ in the first direction of the target pixel corresponding to a currently displayed test image) and the standard coordinate $x_0$ in the first direction is greater than the third threshold $T_3$, and whether a difference between a measured coordinate $y_1$ in the second direction in the current state (i.e., a measured coordinate $y_1$ in the second direction of the target pixel corresponding to the currently displayed test image) and the standard coordinate $y_0$ in the second direction is greater than the third threshold $T_3$.

If it is determined that the difference between the measured coordinate $x_1$ in the first direction in the current state and the standard coordinate $x_0$ in the first direction is to greater than the third threshold $T_3$, and the difference between the measured coordinate $y_1$ in the second direction in the current state and the standard coordinate $y_0$ in the second direction is greater than the third threshold $T_3$ (that is, $|x_1-x_0|>T_3$ and $|y_1-y_0|>T_3$), then S4317 is performed.

If it is determined that the difference between the measured coordinate $x_1$ in the first direction in the current state and the standard coordinate $x_0$ in the first direction is not greater than the third threshold $T_3$, and/or the difference between the measured coordinate $y_1$ in the second direction in the current state and the standard coordinate $y_0$ in the second direction is not greater than the third threshold $T_3$ (that is, $|x_1-x_0|\le T_3$ and/or $|y_1-y_0|\le T_3$), then S500 is performed and the color temperature calibration is ended.

In S432, if the measured coordinate $x_1$ in the first direction is less than the standard coordinate $x_0$ in the first direction, and the measured coordinate $y_1$ in the second direction is greater than the standard coordinate $y_0$ in the second direction, a second method is performed, so as to adjust the pixel values of the third sub-pixel (B) and the second sub-pixel (G).

Figure 9A:
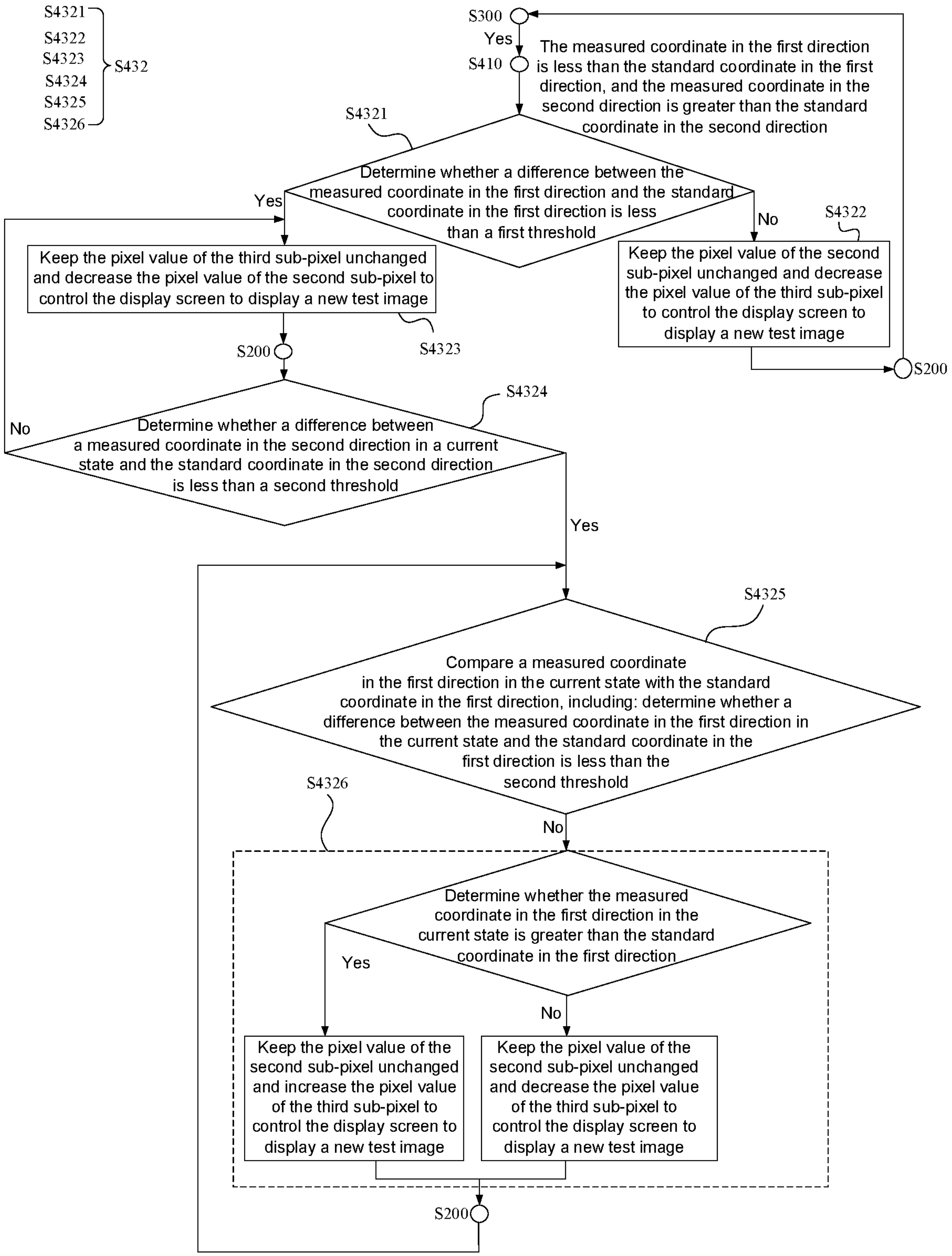
FIGS. 9A and 9B are schematic flow diagrams showing corresponding steps performed in S432, in accordance with some embodiments of the present disclosure.
Figure 9B:
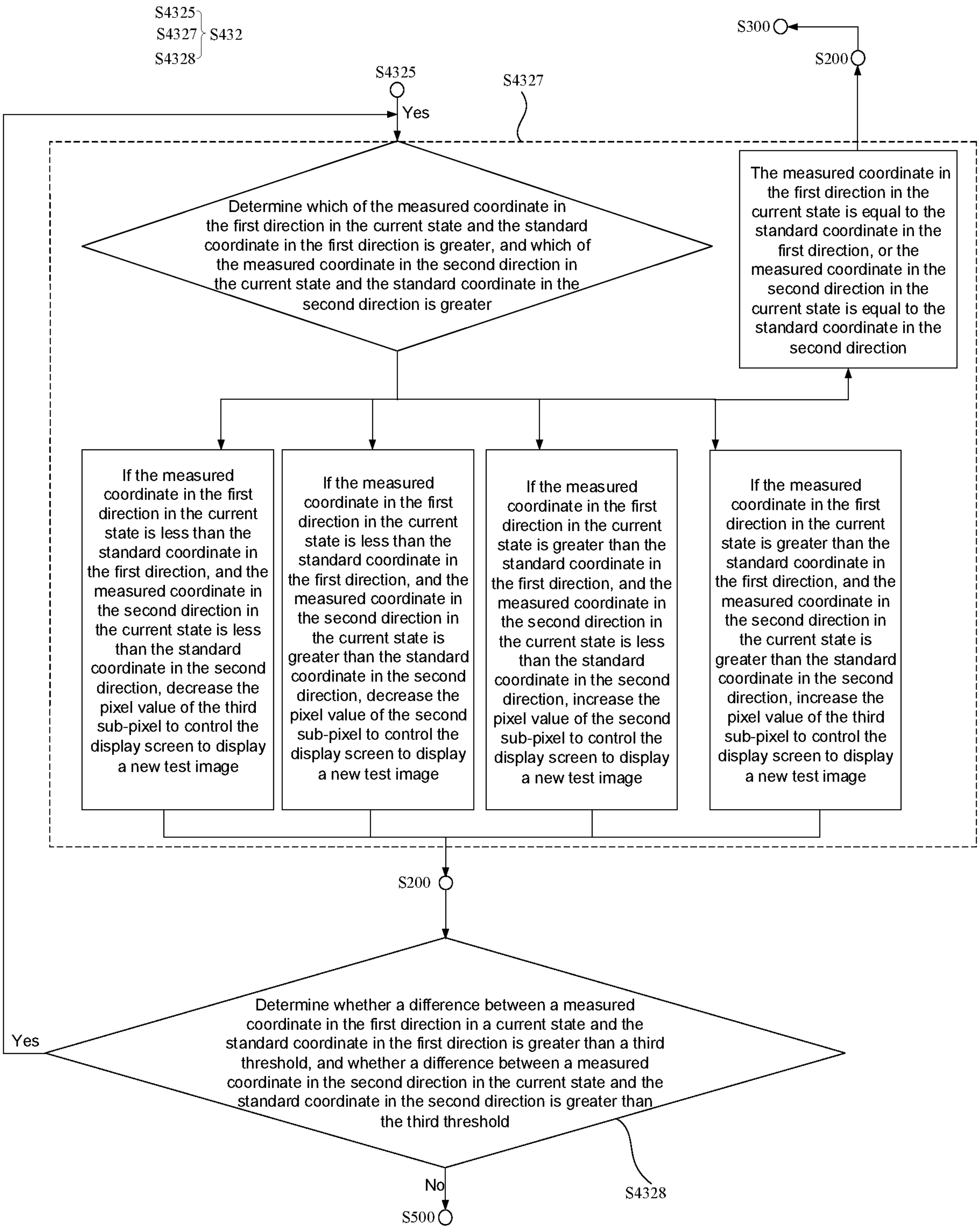

Here, as show in FIGS. 9A and 9B, the second method includes, but is not limited to steps 4321 to 4328 (S4321-S4328).

In S4321, it is determined whether the difference between the measured coordinate $x_1$ in the first direction and the standard coordinate $x_0$ in the first direction is less than the first threshold $T_1$, that is, whether $|x_1-x_0|<T_1$.

If it is determined that the difference between the measured coordinate $x_1$ in the first direction and the standard coordinate $x_0$ in the first direction is not less than the first threshold $T_1$, S4322 is performed. If it is determined that the difference between the measured coordinate $x_1$ in the first direction and the standard coordinate $x_0$ in the first direction is less than the first threshold $T_1$, S4323 is performed.

In S4322, the pixel value of the second sub-pixel (G) is kept unchanged, the pixel value of the third sub-pixel (B) is decreased to control the display screen 100 to display a new test image. Then, S200, S300, and S410 are re-performed, until a difference between a re-obtained measured coordinate $x_1$ in the first direction and the standard coordinate $x_0$ in the first direction is less than the first threshold $T_1$.

In S4323, the pixel value of the second sub-pixel (G) is decreased, the pixel value of the third sub-pixel (B) is kept unchanged to control the display screen 100 to display a new test image. Then, S200 and S4324 are performed.

In S4324, it is determined whether a difference between a measured coordinate $y_1$ in the second direction in a current state (i.e., a measured coordinate $y_1$ in the second direction of the target pixel corresponding to a currently displayed test image) and the standard coordinate $y_0$ in the second direction is less than the second threshold $T_2$, that is, whether $|y_1-y_0|<T_2$.

If it is determined that the difference between the measured coordinate $y_1$ in the second direction in the current state and the standard coordinate $y_0$ in the second direction is not less than the second threshold $T_2$, S4323, S200 and S4324 are performed, until a difference between a re-obtained measured coordinate $y_1$ in the second direction and the standard coordinate $y_0$ in the second direction is less than the second threshold $T_2$.

If it is determined that the difference between the measured coordinate $y_1$ in the second direction in the current state and the standard coordinate $y_0$ in the second direction is less than the second threshold $T_2$, S4325 is performed.

In S4325, a measured coordinate $x_1$ in the first direction in the current state (i.e., a measured coordinate $x_1$ in the first direction of the target pixel corresponding to the currently displayed test image) and the standard coordinate $x_0$ in the first direction are compared. For example, comparing the measured coordinate $x_1$ in the first direction in the current state and the standard coordinate $x_0$ in the first direction, includes, but is not limited to: determining whether a difference between the measured coordinate $x_1$ in the first direction in the current state and the standard coordinate $x_0$ in the first direction is less than the second threshold $T_2$, that is, whether $|x_1-x_0|<T_2$.

If it is determined that the difference between the measured coordinate $x_1$ in the first direction in the current state and the standard coordinate $x_0$ in the first direction is not less than the second threshold $T_2$, S4326 is performed. If it is determined that the difference between the measured coordinate $x_1$ in the first direction in the current state and the standard coordinate $x_0$ in the first direction is less than the second threshold $T_2$, S4327 is performed.

In S4326, the pixel value of the third sub-pixel (B) is adjusted according to which of the measured coordinate $x_1$ in the first direction in the current state and the standard coordinate $x_0$ in the first direction is greater.

For example, adjusting the pixel value of the third sub-pixel (B) according to which of the measured coordinate $x_1$ in the first direction in the current state and the standard coordinate $x_0$ in the first direction is greater includes following steps.

It is determined whether the measured coordinate $x_1$ in the first direction in the current state is greater than the standard coordinate $x_0$ in the first direction.

If it is determined that the measured coordinate $x_1$ in the first direction in the current state is greater than the standard coordinate $x_0$ in the first direction ($x_1>x_0$), the pixel value of the second sub-pixel (G) is kept unchanged, and the pixel value of the third sub-pixel (B) is increased to control the display screen 100 to display a new test image. Then, S200 and S4325 are performed, until a difference between a re-obtained measured coordinate $x_1$ in the first direction and the standard coordinate $x_0$ in the first direction is less than the second threshold $T_2$.

If it is determined that the measured coordinate $x_1$ in the first direction in the current state is less than the standard coordinate $x_0$ in the first direction ($x_1<x_0$), the pixel value of the second sub-pixel (G) is kept unchanged, and the pixel value of the third sub-pixel (B) is decreased to control the display screen 100 to display a new test image. Then, S200 and S4325 are performed, until a difference between a re-obtained measured coordinate $x_1$ in the first direction and the standard coordinate $x_0$ in the first direction is less than the second threshold $T_2$.

In S4327, it is determined which of the measured coordinate $x_1$ in the first direction in the current state and the standard coordinate $x_0$ in the first direction is greater, and which of the measured coordinate $y_1$ in the second direction in the current state and the standard coordinate $y_0$ in the second direction is greater, and the pixel values of the third sub-pixel (B) and the second sub-pixel (G) are adjusted based on a second sub-adjustment mode.

Here, the second sub-adjustment mode is the same as the second sub-adjustment mode described in the above embodiments, and details will not be repeated.

In S4328, it is determined whether a difference between a measured coordinate $x_1$ in the first direction in a current state (i.e., a measured coordinate $x_1$ in the first direction of the target pixel corresponding to a currently displayed test image) and the standard coordinate $x_0$ in the first direction is greater than the third threshold $T_3$, and whether a difference between a measured coordinate $y_1$ in the second direction in the current state (i.e., a measured coordinate $y_1$ in the second direction of the target pixel corresponding to the currently displayed test image) and the standard coordinate $y_0$ in the second direction is greater than the third threshold $T_3$.

If it is determined that the difference between the measured coordinate $x_1$ in the first direction in the current state and the standard coordinate $x_0$ in the first direction is greater than the third threshold $T_3$, and the difference between the measured coordinate $y_1$ in the second direction in the current state and the standard coordinate $y_0$ in the second direction is greater than the third threshold $T_3$ (that is, $|x_1-x_0|>T_3$ and $|y_1-y_0|>T_3$), then S4327 is performed.

If it is determined that the difference between the measured coordinate $x_1$ in the first direction in the current state and the standard coordinate $x_0$ in the first direction is not greater than the third threshold $T_3$, and/or the difference between the measured coordinate $y_1$ in the second direction in the current state and the standard coordinate $y_0$ in the second direction is not greater than the third threshold $T_3$ (that is, $|x_1-x_0|\leq T_3$ and/or $|y_1-y_0|\leq T_3$), then S500 is performed and the color temperature calibration is ended.

In S433, if the measured coordinate $x_1$ in the first direction is greater than the standard coordinate $x_0$ in the first direction, and the measured coordinate $y_1$ in the second direction is less than the standard coordinate $y_0$ in the second direction, a third method is performed, so as to adjust the pixel values of the third sub-pixel (B) and the second sub-pixel (G).

Figure 10A:
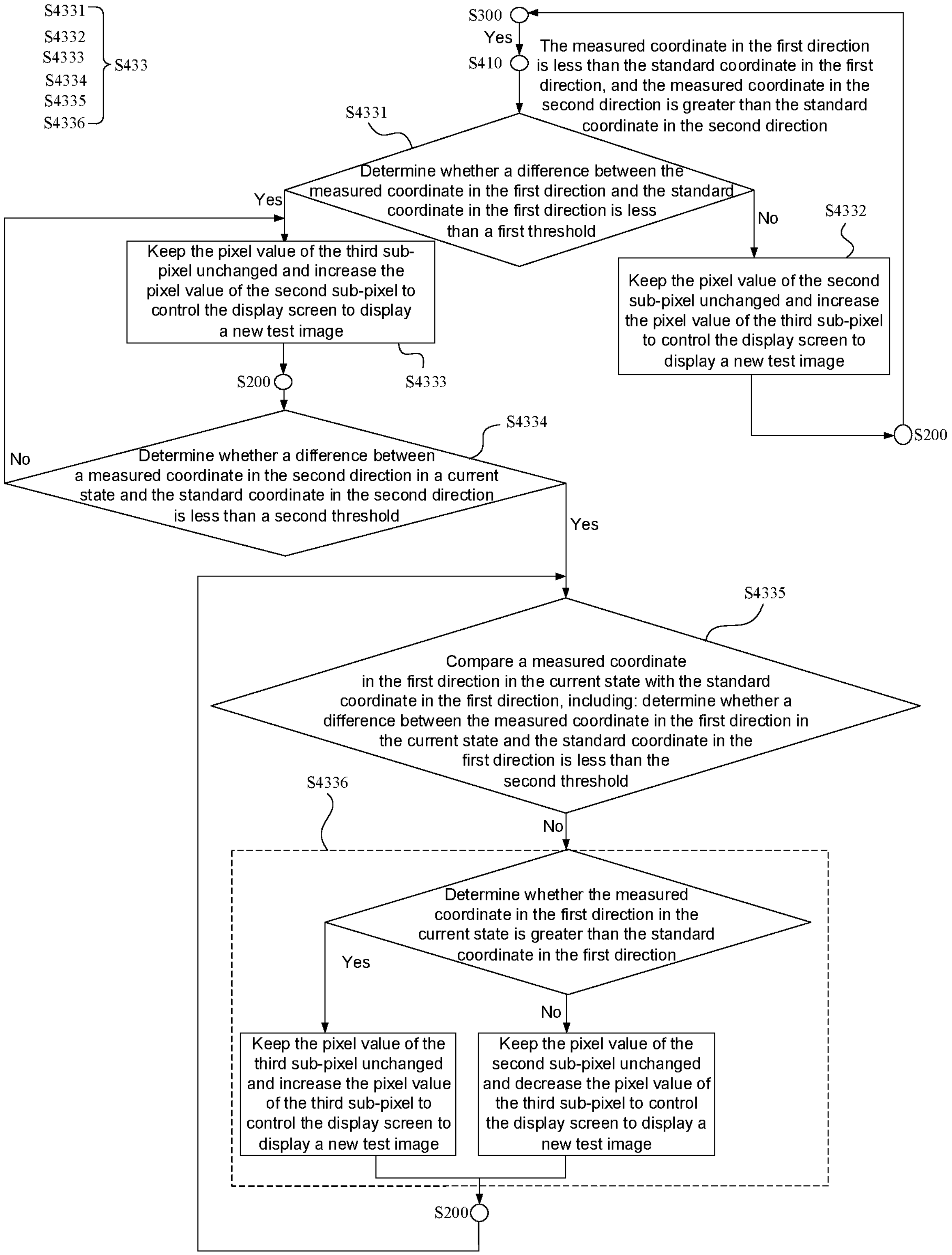
FIGS. 10A and 10B are schematic flow diagrams showing corresponding steps performed in S433, in accordance with some embodiments of the present disclosure.
Figure 10B:
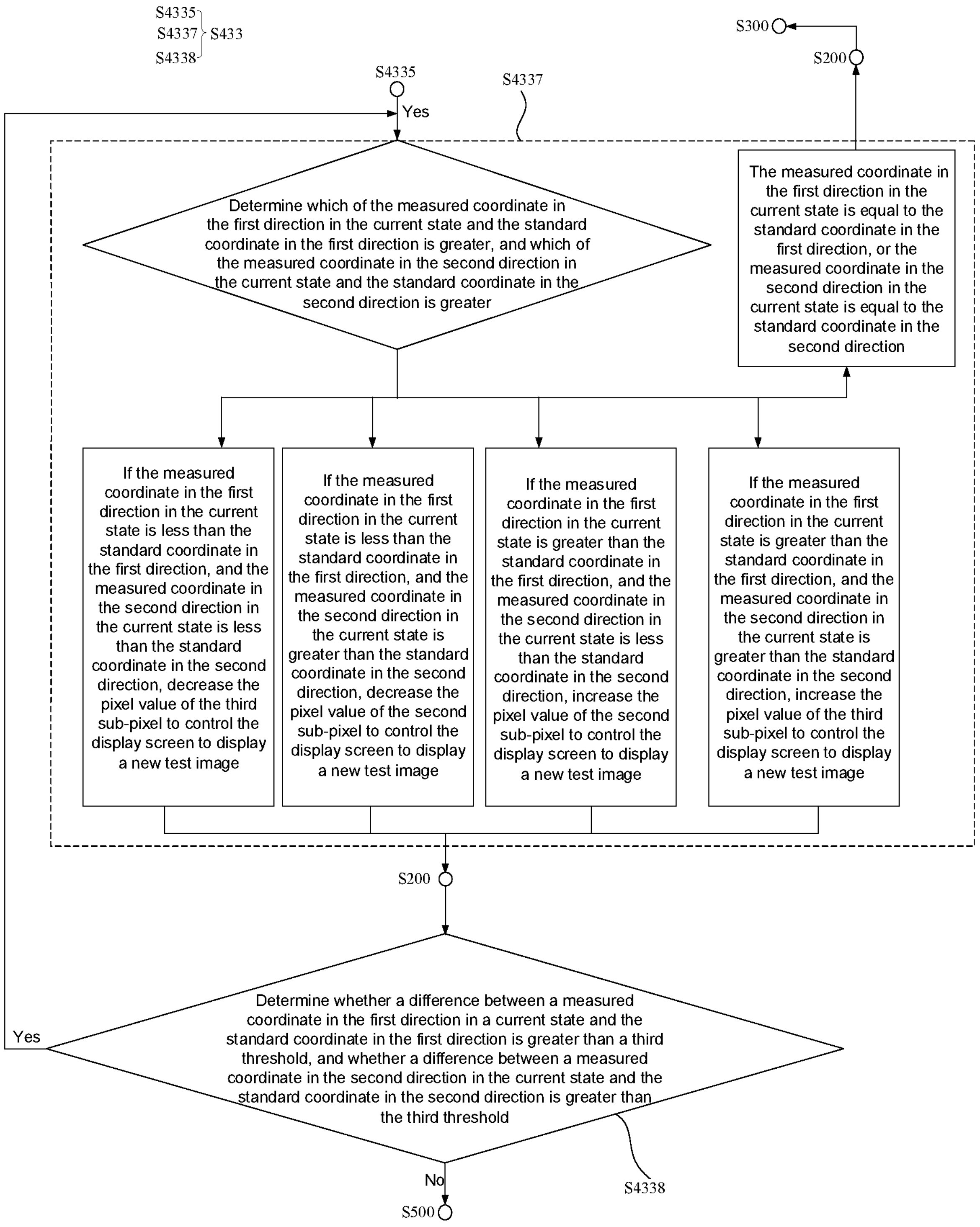

Here, as shown in FIGS. 10A and 10B, the third method includes, but is not limited to steps 4331 to 4338 (S4331 to S4338).

In S4331, it is determined whether the difference between the measured coordinate $x_1$ in the first direction and the standard coordinate $x_0$ in the first direction is less than the first threshold $T_1$, that is, whether $|x_1-x_0|<T_1$.

If it is determined that the difference between the measured coordinate $x_1$ in the first direction and the standard coordinate $x_0$ in the first direction is not less than the first threshold $T_1$, S4332 is performed. If it is determined that the difference between the measured coordinate $x_1$ in the first direction and the standard coordinate $x_0$ in the first direction is less than the first threshold $T_1$, S4333 is performed.

In S4332, the pixel value of the second sub-pixel (G) is kept unchanged, the pixel value of the third sub-pixel (B) is increased to control the display screen 100 to display a new test image. Then, S200, S300, and S410 are re-performed, until a difference between a re-obtained measured coordinate $x_1$ in the first direction and the standard coordinate $x_0$ in the first direction is less than the first threshold $T_1$.

In S4333, the pixel value of the second sub-pixel (G) is increased, and the pixel value of the third sub-pixel (B) is kept unchanged to control the display screen 100 to display a new test image. Then, S200 and S4334 are performed.

In S4334, it is determined whether a difference between a measured coordinate $y_1$ in the second direction in a current state (i.e., a measured coordinate $y_1$ in the second direction of the target pixel corresponding to a currently displayed test image) and the standard coordinate $y_0$ in the second direction is less than the second threshold $T_2$, that is, whether $|y_1-y_0|<T_2$.

If it is determined that the difference between the measured coordinate $y_1$ in the second direction in the current state and the standard coordinate $y_0$ in the second direction is not less than the second threshold $T_2$, S4333, S200 and S4334 are performed, until a difference between a re-obtained measured coordinate $y_1$ in the second direction and the standard coordinate $y_0$ in the second direction is less than the second threshold $T_2$.

If it is determined that the difference between the measured coordinate $y_1$ in the second direction in the current state and the standard coordinate $y_0$ in the second direction is less than the second threshold $T_2$, S4335 is performed.

In S4335, a measured coordinate $x_1$ in the first direction in the current state (i.e., a measured coordinate $x_1$ in the first direction of the target pixel corresponding to the currently displayed test image) and the standard coordinate $x_0$ in the first direction are compared. For example, comparing the measured coordinate $x_1$ in the first direction in the current state and the standard coordinate $x_0$ in the first direction, includes, but is not limited to: determining whether a difference between the measured coordinate $x_1$ in the first direction in the current state and the standard coordinate $x_0$ in the first direction is less than the second threshold $T_2$, that is, whether $|x_1-x_0|<T_2$.

If it is determined that the difference between the measured coordinate $x_1$ in the first direction in the current state and the standard coordinate $x_0$ in the first direction is not less than the second threshold $T_2$, S4336 is performed. If it is determined that the difference between the measured coordinate $x_1$ in the first direction in the current state and the standard coordinate $x_0$ in the first direction is less than the second threshold $T_2$, S4337 is performed.

In S4336, the pixel value of the third sub-pixel (B) is adjusted according to which of the measured coordinate $x_1$ in the first direction in the current state and the standard coordinate $x_0$ in the first direction is greater.

For example, adjusting the pixel value of the third sub-pixel (B) according to which of the measured coordinate $x_1$ in the first direction in the current state and the standard coordinate $x_0$ in the first direction is greater includes following steps.

It is determined whether the measured coordinate $x_1$ in the first direction in the current state is greater than the standard coordinate $x_0$ in the first direction.

If it is determined that the measured coordinate $x_1$ in the first direction in the current state is greater than the standard coordinate $x_0$ in the first direction ($x_1>x_0$), the pixel value of the second sub-pixel (G) is kept unchanged, and the pixel value of the third sub-pixel (B) is increased to control the display screen 100 to display a new test image. Then, S200 and S4335 are performed, until a difference between a re-obtained measured coordinate $x_1$ in the first direction and the standard coordinate $x_0$ in the first direction is less than the second threshold $T_2$.

If it is determined that the measured coordinate $x_1$ in the first direction in the current state is less than the standard coordinate $x_0$ in the first direction ($x_1<x_0$), the pixel value of the second sub-pixel (G) is kept unchanged, and the pixel value of the third sub-pixel (B) is decreased to control the display screen 100 to display a new test image. Then, S200 and S4335 are performed, until a difference between a re-obtained measured coordinate $x_1$ in the first direction and the standard coordinate $x_0$ in the first direction is less than the second threshold $T_2$.

In S4337, it is determined which of the measured coordinate $x_1$ in the first direction in the current state and the standard coordinate $x_0$ in the first direction is greater, and which of the measured coordinate $y_1$ in the second direction in the current state and the standard coordinate $y_0$ in the second direction is greater, and the pixel values of the third sub-pixel (B) and the second sub-pixel (G) are adjusted based on a second sub-adjustment mode.

Here, the second sub-adjustment mode is the same as the second sub-adjustment mode described in the above embodiments, and details will not be repeated.

In S4338, it is determined whether a difference between a measured coordinate $x_1$ in the first direction in a current state (i.e., a measured coordinate $x_1$ in the first direction of the target pixel corresponding to a currently displayed test image) and the standard coordinate $x_0$ in the first direction is greater than the third threshold $T_3$, and whether a difference between a measured coordinate $y_1$ in the second direction in the current state (i.e., a measured coordinate $y_1$ in the second direction of the target pixel corresponding to the currently displayed test image) and the standard coordinate $y_0$ in the second direction is greater than the third threshold $T_3$.

If it is determined that the difference between the measured coordinate $x_1$ in the first direction in the current state and the standard coordinate $x_0$ in the first direction is greater than the third threshold $T_3$, and the difference between the measured coordinate $y_1$ in the second direction in the current state and the standard coordinate $y_0$ in the second direction is greater than the third threshold $T_3$ (that is, $|x_1-x_0|>T_3$ and $|y_1-y_0|>T_3$), then S4337 is performed.

If it is determined that the difference between the measured coordinate $x_1$ in the first direction in the current state and the standard coordinate $x_0$ in the first direction is not greater than the third threshold $T_3$, and/or the difference between the measured coordinate $y_1$ in the second direction in the current state and the standard coordinate $y_0$ in the second direction is not greater than the third threshold $T_3$ (that is, $|x_1-x_0|\leq T_3$ and/or $|y_1-y_0|T_3$), then S500 is performed and the color temperature calibration is ended.

As described above, in the color temperature calibration method provided in the embodiments of the present disclosure, the first adjustment mode or the second adjustment mode is performed correspondingly according to whether the measured coordinate $x_1$ in the first direction is greater than the standard coordinate $x_0$ in the first direction, and whether the measured coordinate $y_1$ in the second direction is greater than the standard coordinate $y_0$ in the second direction. In a case where the second adjustment mode is performed, the first method, the second method, or the third method may be performed correspondingly according to which of the measured coordinate $x_1$ in the first direction and the standard coordinate $x_0$ in the first direction is greater, and which of the measured coordinate $y_1$ in the second direction and the standard coordinate $y_0$ in the second direction is greater. In this way, for the color temperature calibration method provided in the embodiments of the present disclosure, it may be possible to reasonably and accurately adjust the pixel value(s) of the target pixel according to the measured color coordinates $(x_1, y_1)$ of the target pixel, effectively shorten a calibration duration of the color temperature of the display screen, and thereby improve calibration efficiency of the color temperature of the display screen.

In addition, in the embodiments of the present disclosure, different test images may be selected for color temperature calibration, depending on the type of the display screen 100.

For a display screen where the color temperature does not or is not easy to change with time or pixel value, for example, for a display screen in a monitor, a white image may be selected as the test image. That is, the target pixel to be measured is a white pixel. In this way, initial pixel values of the first sub-pixel (R), the second sub-pixel (G), and the third sub-pixel (B) in the target pixel are all set to the maximum pixel values thereof. For example, in a case where a pixel value of each sub-pixel is in a range from 0 to 1023, the initial pixel values of the first sub-pixel (R), the second sub-pixel (G), and the third sub-pixel (B) are all set to 1023.

Based on this, when the pixel values of the first sub-pixel (R) and the second sub-pixel (G) are adjusted under the first adjustment mode, the pixel value of the third sub-pixel (B) that is kept unchanged is the maximum pixel value (i.e., 1023) thereof. When the pixel values of the third sub-pixel (B) and the second sub-pixel (G) are adjusted under the second adjustment mode, the pixel value of the first sub-pixel (R) that is kept unchanged is the maximum pixel value (i.e., 1023) thereof. In this way, in a process of adjusting the pixel values of the target pixel, it may be ensured that the test image displayed on the display screen 100 has the greatest possible brightness.

For a display screen where the color temperature changes as the pixel value changes (for example, for a liquid crystal display where the color temperature will jump as the pixel value changes), a set of gray scale images with different gray scale values may be selected as the test image, and the measurement and calibration are performed on each gray scale image one by one. Optionally, the gray scale values of the gray scale images increase progressively according to a certain rule. For example, the gray scale values of the gray scale images increase progressively at an amplitude of not less than 10%. In this way, in all the gray scales that can be displayed on the display screen, a gray scale value that has not been calibrated by the color temperature self-calibration system may be calibrated according to a near-consistency principle. That is, a pixel value adjustment amount of a pixel whose gray scale value has not been calibrated is determined according to a pixel value adjustment amount of a pixel whose gray scale value has been calibrated and is closest to the gray scale value that has not been calibrated. For example, the pixel value of the target pixel is in a range from 0 to 1023; and all the gray scales that can be displayed on the display screen are normalized. Based on this, when the gray scale is 1, initial pixel values of a first target pixel (R, G, B) are (1023, 1023, 1023), and corresponding calibrated pixel values are (1023×1=1023, 1023×0.9≈921, 1023×0.8 818). When the gray scale is 0.9, initial pixel values of a second target pixel (R, G, B) are (1023×0.9 921, 1023×0.9 921, 1023×0.9 921), and corresponding calibrated pixel values are (1023×0.9 921, 1023×0.8 818, 1023×0.74≈757). When the gray scale is 0.978, initial pixel values of a third target pixel (R, G, B) are (1023×0.978≈1000, 1023×0.978≈1000, 1023×0.978≈1000). Since the gray scale 0.978 is close to the gray scale 1, the calibrated pixel values of the third target pixel may be obtained with reference to the first target pixel. That is, the adjusted pixel values of the target pixel 3 should be (1000×1=1000, 1000×0.9=900, 1000×0.8=800). And so forth.

In the above embodiments, the pixel value adjustment amount (i.e., the adjustment amplitude of the pixel value) of the sub-pixels (including the first sub-pixel (R), the second sub-pixel (G) and the third sub-pixel (B)) in the target pixel may be determined according to the difference between the measured coordinate $x_1$ in the first direction and the standard coordinate $x_0$ in the first direction, and/or the difference between the measured coordinate $y_1$ in the second direction and the standard coordinate $y_0$ in the second direction.

Optionally, the pixel values of the target pixel are in a range from 0 to 1023. The first threshold $T_1$=0.011, the second threshold $T_2$=0.01, the third threshold $T_3$=0.003, and the target threshold $T_0$=0.01. The adjustment amplitude of the pixel value Para of each sub-pixel in the target pixel are shown in Table 3.

TABLE 3

| Δx gradient | Δy gradient | Adjustment amplitude of pixel value |
|---|---|---|
| $\lvert x_1 - x_0\rvert \geq 0.012$ | $\lvert y_1 - y_0\rvert \geq 0.012$ | Para ± 15 |
| $\lvert x_1 - x_0\rvert \geq 0.011$ | $\lvert y_1 - y_0\rvert \geq 0.011$ | Para ± 10 |
| $\lvert x_1 - x_0\rvert \geq 0.01$ | $\lvert y_1 - y_0\rvert \geq 0.01$ | Para ± 5 |

TABLE 3-continued

| Δx gradient | Δy gradient | Adjustment amplitude of pixel value |
|---|---|---|
| $\lvert x_1 - x_0\rvert \geq 0.005$ | $\lvert y_1 - y_0\rvert \geq 0.005$ | Para ± 3 |
| $\lvert x_1 - x_0\rvert \geq 0.003$ | $\lvert y_1 - y_0\rvert \geq 0.003$ | Para ± 2 |
| $\lvert x_1 - x_0\rvert < 0.003$ | $\lvert y_1 - y_0\rvert < 0.003$ | Para ± 1 |

It can be seen that, the greater the difference Δx between the measured coordinate $x_1$ in the first direction and the standard coordinate $x_0$ in the first direction, the greater the adjustment amplitude of a single adjustment of the pixel value of a corresponding sub-pixel; and the greater the difference Δy between the measured coordinate $y_1$ in the second direction and the standard coordinate $y_0$ in the second direction, the greater the adjustment amplitude of a single adjustment of the pixel value of a corresponding sub-pixel.

Therefore, in the process of performing the color temperature calibration method, every time the pixel value of any sub-pixel in the target pixel is adjusted, the adjustment amplitude of the pixel value may be determined according to Table 3. And, if $\lvert x_1-x_0\rvert<0.003$ and $\lvert y_1-y_0\rvert<0.003$, S500 may be directly performed to end the color temperature calibration; or, a last adjustment may also be performed on the pixel value of the corresponding sub-pixel, for example, "Para±1" is performed, and then S500 is performed to end the color temperature calibration.

It will be added that, the adjustment amplitude of a single adjustment of the pixel value of the sub-pixel in the target pixel is related to a range of the pixel value. For example, if the pixel value of the sub-pixel in the target pixel is in a range from 0 to 255, the adjustment amplitude of the pixel value of the sub-pixel in the target pixel may be obtained by multiplying a value in Table 3 by a corresponding scale factor k, and the scale factor is: k=256/1024. And so forth.

Some embodiments of the present disclosure provide a computer-readable storage medium (e.g., a non-transitory computer-readable storage medium) in which computer program instructions are stored. The computer-readable storage medium stores computer program instructions that, when running in a color temperature self-calibration system (e.g., in the one or more processors thereof), cause the color temperature self-calibration system to perform one or more steps in the color temperature calibration method as described in any one of the above embodiments.

For example, the computer-readable storage medium may include, but is not limited to, a magnetic storage device (e.g., a hard disk, a floppy disk or a magnetic tape), an optical disk (e.g., a compact disk (CD)), a digital versatile disk (DVD), a smart card or a flash memory device (e.g., an EPROM). Various computer-readable storage media described in the present disclosure may refer to one or more devices for storing information and/or other machine-readable storage medium. The term "machine-readable storage medium" may include, but is not limited to, wireless channels and other various media capable of storing, containing and/or carrying instructions and/or data.

Some embodiments of the present disclosure further provide a computer program. When running in the color temperature self-calibration system, the computer program causes the color temperature self-calibration system to perform one or more steps in the color temperature calibration method as described in any one of the above embodiments.

Beneficial effects of the computer-readable storage medium and the computer program are the same as those of the color temperature calibration method as described in the above embodiments, and details will be not repeated here.

In the description of the above embodiments, specific features, structures, materials or characteristics may be combined in any one or more embodiments or examples in any suitable manner.

The foregoing descriptions are merely specific implementations of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A color temperature self-calibration system, comprising:

a colorimeter; and a display terminal, the display terminal including the display screen, a memory, and one or more processors, wherein the display screen is configured to display the test image;

the colorimeter is configured to measure the chromaticity of the target pixel in the display screen, and transmit obtained measured color coordinates of the target pixel to the one or more processors;

the memory stores one or more programs; and the one or more processors read the one or more programs stored in the memory to perform a color temperature calibration method, comprising:

making a display screen display a test image at a target color temperature;

measuring a chromaticity of a target pixel in the display screen to obtain measured color coordinates of the target pixel;

comparing the measured color coordinates with standard color coordinates;

if differences between the measured color coordinates and the standard color coordinates are greater than a target threshold, adjusting at least one of pixel values of the target pixel, until differences between re-obtained measured color coordinates and the standard color coordinates are not greater than the target threshold; and if differences between the measured color coordinates and the standard color coordinates are not greater than the target threshold, ending the color temperature calibration, wherein: the measured color coordinates include a measured coordinate in a first direction and a measured coordinate in a second direction, and the standard color coordinates includes a standard coordinate in the first direction and a standard coordinate in the second direction; and comparing the measured color coordinates with the standard color coordinates, includes: comparing the measured coordinate in the first direction with the standard coordinate in the first direction, and comparing the measured coordinate in the second direction with the standard coordinate in the second direction, wherein the differences between the measured color coordinates and the standard color coordinates being greater than the target threshold, includes that: a difference between the measured coordinate in the first direction and the standard coordinate in the first direction is greater than the target threshold, and a difference between the measured coordinate in the second direction and the standard coordinate in the second direction is greater than the target threshold, wherein: the target pixel includes a first sub-pixel, a second sub-pixel and a third sub-pixel of different colors; and adjusting the at least one of the pixel values of the target pixel, includes: adjusting at least one of a pixel value of the first sub-pixel, a pixel value of the second sub-pixel, and a pixel value of the third sub-pixel, according to which of the measured coordinate in the first direction and the standard coordinate in the first direction is greater, and which of the measured coordinate in the second direction and the standard coordinate in the second direction is greater, includes:

determining whether the measured coordinate in the first direction is greater than the standard coordinate in the first direction, and whether the measured coordinate in the second direction is greater than the standard coordinate in the second direction;

if it is determined that the measured coordinate in the first direction is greater than the standard coordinate in the first direction, and the measured coordinate in the second direction is greater than the standard coordinate in the second direction, keeping the pixel value of the third sub-pixel unchanged, and adjusting pixel values of the first sub-pixel and the second sub-pixel based on a first adjustment mode; and if it is determined that the measured coordinate in the first direction is not greater than the standard coordinate in the first direction, and/or the measured coordinate in the second direction is not greater than the standard coordinate in the second direction, keeping the pixel value of the first sub-pixel unchanged, and adjusting pixel values of the third sub-pixel and the second sub-pixel based on a second adjustment mode, wherein adjusting the pixel values of the first sub-pixel and the second sub-pixel based on the first adjustment mode includes:

determining whether the difference between the measured coordinate in the first direction and the standard coordinate in the first direction is less than a first threshold;

if it is determined that the difference between the measured coordinate in the first direction and the standard coordinate in the first direction is not less than the first threshold, decreasing the pixel value of the first sub-pixel, re-obtaining a measured coordinate in the first direction corresponding to the target pixel of which the pixel value of the first sub-pixel is adjusted, and determining the difference between the re-obtained measured coordinate in the first direction and the standard coordinate in the first direction, until the difference between the re-obtained measured coordinate in the first direction and the standard coordinate in the first direction is less than the first threshold; and if it is determined that the difference between the measured coordinate in the first direction and the standard coordinate in the first direction is less than the first threshold, decreasing the pixel value of the second sub-pixel, re-obtaining a measured coordinate in the second direction corresponding to the target pixel of which the pixel value of the second sub-pixel is adjusted, and determining the difference between the re-obtained measured coordinate in the second direction and the standard coordinate in the second direction, until the difference between the re-obtained measured coordinate in the second direction and the standard coordinate in the second direction is less than a second threshold.

2. A color temperature calibration method, comprising:

making a display screen display a test image at a target color temperature;

measuring a chromaticity of a target pixel in the display screen to obtain measured color coordinates of the target pixel;

comparing the measured color coordinates with standard color coordinates;

if differences between the measured color coordinates and the standard color coordinates are greater than a target threshold, adjusting at least one of pixel values of the target pixel, until differences between re-obtained measured color coordinates and the standard color coordinates are not greater than the target threshold; and if differences between the measured color coordinates and the standard color coordinates are not greater than the target threshold, ending the color temperature calibration, wherein: the measured color coordinates include a measured coordinate in a first direction and a measured coordinate in a second direction, and the standard color coordinates includes a standard coordinate in the first direction and a standard coordinate in the second direction; and comparing the measured color coordinates with the standard color coordinates, includes: comparing the measured coordinate in the first direction with the standard coordinate in the first direction, and comparing the measured coordinate in the second direction with the standard coordinate in the second direction, wherein the differences between the measured color coordinates and the standard color coordinates being greater than the target threshold, includes that: a difference between the measured coordinate in the first direction and the standard coordinate in the first direction is greater than the target threshold, and a difference between the measured coordinate in the second direction and the standard coordinate in the second direction is greater than the target threshold, wherein: the target pixel includes a first sub-pixel, a second sub-pixel and a third sub-pixel of different colors; and adjusting the at least one of the pixel values of the target pixel, includes: adjusting at least one of a pixel value of the first sub-pixel, a pixel value of the second sub-pixel, and a pixel value of the third sub-pixel, according to which of the measured coordinate in the first direction and the standard coordinate in the first direction is greater, and which of the measured coordinate in the second direction and the standard coordinate in the second direction is greater, includes:

determining whether the measured coordinate in the first direction is greater than the standard coordinate in the first direction, and whether the measured coordinate in the second direction is greater than the standard coordinate in the second direction;

if it is determined that the measured coordinate in the first direction is greater than the standard coordinate in the first direction, and the measured coordinate in the second direction is greater than the standard coordinate in the second direction, keeping the pixel value of the third sub-pixel unchanged, and adjusting pixel values of the first sub-pixel and the second sub-pixel based on a first adjustment mode; and if it is determined that the measured coordinate in the first direction is not greater than the standard coordinate in the first direction, and/or the measured coordinate in the second direction is not greater than the standard coordinate in the second direction, keeping the pixel value of the first sub-pixel unchanged, and adjusting pixel values of the third sub-pixel and the second sub-pixel based on a second adjustment mode, wherein adjusting the pixel values of the first sub-pixel and the second sub-pixel based on the first adjustment mode includes:

determining whether the difference between the measured coordinate in the first direction and the standard coordinate in the first direction is less than a first threshold;

if it is determined that the difference between the measured coordinate in the first direction and the standard coordinate in the first direction is not less than the first threshold, decreasing the pixel value of the first sub-pixel, re-obtaining a measured coordinate in the first direction corresponding to the target pixel of which the pixel value of the first sub-pixel is adjusted, and determining the difference between the re-obtained measured coordinate in the first direction and the standard coordinate in the first direction, until the difference between the re-obtained measured coordinate in the first direction and the standard coordinate in the first direction is less than the first threshold; and if it is determined that the difference between the measured coordinate in the first direction and the standard coordinate in the first direction is less than the first threshold, decreasing the pixel value of the second sub-pixel, re-obtaining a measured coordinate in the second direction corresponding to the target pixel of which the pixel value of the second sub-pixel is adjusted, and determining the difference between the re-obtained measured coordinate in the second direction and the standard coordinate in the second direction, until the difference between the re-obtained measured coordinate in the second direction and the standard coordinate in the second direction is less than a second threshold.

3. The color temperature calibration method according to claim 1, further comprising:

if it is determined that the difference between the re-obtained measured coordinate in the second direction and the standard coordinate in the second direction is less than the second threshold, comparing a measured coordinate in the first direction in a current state with the standard coordinate in the first direction;

if it is determined that a difference between the measured coordinate in the first direction in the current state and the standard coordinate in the first direction is not less than the second threshold, determining whether the measured coordinate in the first direction in the current state is greater than the standard coordinate in the first direction;

if it is determined that the measured coordinate in the first direction in the current state is greater than the standard coordinate in the first direction, decreasing the pixel value of the first sub-pixel;

if it is determined that the measured coordinate in the first direction in the current state is less than the standard coordinate in the first direction, increasing the pixel value of the first sub-pixel;

re-obtaining a measured coordinate in the first direction corresponding to the target pixel of which the pixel value of the first sub-pixel is adjusted; and determining a difference between the re-obtained measured coordinate in the first direction and the standard coordinate in the first direction, until the difference between the re-obtained measured coordinate in the first direction and the standard coordinate in the first direction is less than the second threshold, wherein the first threshold is greater than the second threshold, and the target threshold is less than or equal to the second threshold.

4. The color temperature calibration method according to claim 3, further comprising:

if it is determined that the difference between the re-obtained measured coordinate in the first direction and the standard coordinate in the first direction is less than the second threshold, adjusting the pixel values of the first sub-pixel and the second sub-pixel based on a first sub-adjustment mode;

re-obtaining measured color coordinates corresponding to the target pixel of which the pixel values of the first sub-pixel and the second sub-pixel are adjusted;

determining differences between the re-obtained measured color coordinates and the standard color coordinates, until a difference between a re-obtained measured coordinate in the first direction in the re-obtained measured color coordinates and the standard coordinate in the first direction is not greater than a third threshold, and/or a difference between a re-obtained measured coordinate in the second direction in the re-obtained measured color coordinates and the standard coordinate in the second direction is not greater than the third threshold; and ending the color temperature calibration, wherein the second threshold is greater than the third threshold, and the target threshold is not less than the third threshold.

5. The color temperature calibration method according to claim 4, wherein the first sub-adjustment mode includes:

if the re-obtained measured coordinate in the first direction is less than the standard coordinate in the first direction, and the re-obtained measured coordinate in the second direction is less than the standard coordinate in the second direction, increasing the pixel values of the first sub-pixel and the second sub-pixel;

if the re-obtained measured coordinate in the first direction is less than the standard coordinate in the first direction, and the re-obtained measured coordinate in the second direction is greater than the standard coordinate in the second direction, increasing the pixel value of the first sub-pixel or decreasing the pixel value of the second sub-pixel;

if the re-obtained measured coordinate in the first direction is greater than the standard coordinate in the first direction, and the re-obtained measured coordinate in the second direction is less than the standard coordinate in the second direction, decreasing the pixel value of the first sub-pixel or increasing the pixel value of the second sub-pixel; and if the re-obtained measured coordinate in the first direction is greater than the standard coordinate in the first direction, and the re-obtained measured coordinate in the second direction is greater than the standard coordinate in the second direction, decreasing the pixel values of the first sub-pixel and the second sub-pixel.

6. The color temperature calibration method according to claim 2, wherein adjusting the pixel values of the third sub-pixel and the second sub-pixel based on the second adjustment mode includes:

if the measured coordinate in the first direction is less than the standard coordinate in the first direction, and the measured coordinate in the second direction is less than the standard coordinate in the second direction, performing a first method;

if the measured coordinate in the first direction is less than the standard coordinate in the first direction, and the measured coordinate in the second direction is greater than the standard coordinate in the second direction, performing a second method; and if the measured coordinate in the first direction is greater than the standard coordinate in the first direction, and the measured coordinate in the second direction is less than the standard coordinate in the second direction, performing a third method.

7. The color temperature calibration method according to claim 6, wherein the first method includes:

determining whether the difference between the measured coordinate in the first direction and the standard coordinate in the first direction is less than the first threshold;

if it is determined that the difference between the measured coordinate in the first direction and the standard coordinate in the first direction is not less than the first threshold, decreasing the pixel value of the third sub-pixel, re-obtaining a measured coordinate in the first direction corresponding to the target pixel of which the pixel value of the third sub-pixel is adjusted, and determining a difference between the re-obtained measured coordinate in the first direction and the standard coordinate in the first direction, until the difference between the re-obtained measured coordinate in the first direction and the standard coordinate in the first direction is less than the first threshold;

if it is determined that the difference between the measured coordinate in the first direction and the standard coordinate in the first direction is less than the first threshold, determining whether the measured coordinate in the second direction is greater than the standard coordinate in the second direction;

if it is determined that the measured coordinate in the second direction is greater than the standard coordinate in the second direction, decreasing the pixel value of the second sub-pixel;

if it is determined that the measured coordinate in the second direction is less than the standard coordinate in the second direction, increasing the pixel value of the second sub-pixel;

re-obtaining a measured coordinate in the second direction corresponding to the target pixel of which the pixel value of the second sub-pixel is adjusted; and determining a difference between the re-obtained measured coordinate in the second direction and the standard coordinate in the second direction, until the difference between the re-obtained measured coordinate in the second direction and the standard coordinate in the second direction is less than a second threshold.

8. The color temperature calibration method according to claim 7, further comprising:

if the difference between the re-obtained measured coordinate in the second direction and the standard coordinate in the second direction is less than the second threshold, comparing a measured coordinate in the first direction in a current state with the standard coordinate in the first direction;

if it is determined that a difference between the measured coordinate in the first direction in the current state and the standard coordinate in the first direction is not less than the second threshold, determining whether the re-obtained measured coordinate in the first direction is greater than the standard coordinate in the first direction;

if it is determined that the measured coordinate in the first direction in the current state is greater than the standard coordinate in the first direction, increasing the pixel value of the third sub-pixel;

if it is determined that the measured coordinate in the first direction in the current state is less than the standard coordinate in the first direction, decreasing the pixel value of the third sub-pixel;

re-obtaining a measured coordinate in the first direction corresponding to the target pixel of which the pixel value of the third sub-pixel is adjusted; and determining a difference between the re-obtained measured coordinate in the first direction and the standard coordinate in the first direction, until the difference between the re-obtained measured coordinate in the first direction and the standard coordinate in the first direction is less than the second threshold, wherein the first threshold is greater than the second threshold, and the target threshold is less than or equal to the second threshold.

9. The color temperature calibration method according to claim 8, further comprising:

if the difference between the re-obtained measured coordinate in the first direction and the standard coordinate in the first direction is less than the second threshold, adjusting the pixel values of the second sub-pixel and the third sub-pixel based on a second sub-adjustment mode;

re-obtaining measured color coordinates corresponding to the target pixel of which the pixel values of the second sub-pixel and the third sub-pixel are adjusted;

determining differences between the re-obtained measured color coordinates and the standard color coordinates, until a difference between a re-obtained measured coordinate in the first direction in the re-obtained measured color coordinates and the standard coordinate in the first direction is not greater than a third threshold, and/or a difference between a re-obtained measured coordinate in the second direction in the re-obtained measured color coordinates and the standard coordinate in the second direction is not greater than the third threshold; and ending the color temperature calibration, wherein the second threshold is greater than the third threshold, and the target threshold is not less than the third threshold.

10. The color temperature calibration method according to claim 9, wherein the second sub-adjustment mode includes:

if the re-obtained measured coordinate in the first direction is less than the standard coordinate in the first direction, and the re-obtained measured coordinate in the second direction is less than the standard coordinate in the second direction, decreasing the pixel value of the third sub-pixel;

if the re-obtained measured coordinate in the first direction is less than the standard coordinate in the first direction, and the re-obtained measured coordinate in the second direction is greater than the standard coordinate in the second direction, decreasing the pixel value of the second sub-pixel;

if the re-obtained measured coordinate in the first direction is greater than the standard coordinate in the first direction, and the re-obtained measured coordinate in the second direction is less than the standard coordinate in the second direction, increasing the pixel value of the second sub-pixel; and if the re-obtained measured coordinate in the first direction is greater than the standard coordinate in the first direction, and the re-obtained measured coordinate in the second direction is greater than the standard coordinate in the second direction, increasing the pixel value of the third sub-pixel.

11. The color temperature calibration method according to claim 6, wherein the second method includes:

determining whether the difference between the measured coordinate in the first direction and the standard coordinate in the first direction is less than the first threshold;

if it is determined that the difference between the measured coordinate in the first direction and the standard coordinate in the first direction is not less than the first threshold, decreasing the pixel value of the third sub-pixel, re-obtaining a measured coordinate in the first direction corresponding to the target pixel of which the pixel value of the third sub-pixel is adjusted, and determining a difference between the re-obtained measured coordinate in the first direction and the standard coordinate in the first direction, until the difference between the re-obtained measured coordinate in the first direction and the standard coordinate in the first direction is less than the first threshold; and if it is determined that the difference between the measured coordinate in the first direction and the standard coordinate in the first direction is less than the first threshold, decreasing the pixel value of the second sub-pixel, re-obtaining a measured coordinate in the second direction corresponding to the target pixel of which the pixel value of the second sub-pixel is adjusted, and determining a difference between the re-obtained measured coordinate in the second direction and the standard coordinate in the second direction, until the difference between the re-obtained measured coordinate in the second direction and the standard coordinate in the second direction is less than a second threshold.

12. The color temperature calibration method according to claim 11, further comprising:

if the difference between the re-obtained measured coordinate in the second direction and the standard coordinate in the second direction is less than the second threshold, comparing a measured coordinate in the first direction in a current state with the standard coordinate in the first direction;

if it is determined that a difference between the measured coordinate in the first direction in the current state and the standard coordinate in the first direction is not less than the second threshold, determining whether the measured coordinate in the first direction in the current state is greater than the standard coordinate in the first direction;

if it is determined that the measured coordinate in the first direction in the current state is greater than the standard coordinate in the first direction, increasing the pixel value of the third sub-pixel;

if it is determined that the measured coordinate in the first direction in the current state is not greater than the standard coordinate in the first direction, decreasing the pixel value of the third sub-pixel;

re-obtaining a measured coordinate in the first direction corresponding to the target pixel of which the pixel value of the third sub-pixel is adjusted; and determining a difference between the re-obtained measured coordinate in the first direction and the standard coordinate in the first direction, until the difference between the re-obtained measured coordinate in the first direction and the standard coordinate in the first direction is less than the second threshold, wherein the first threshold is greater than the second threshold, and the target threshold is less than or equal to the second threshold.

13. The color temperature calibration method according to claim 12, further comprising:

if the difference between the re-obtained measured coordinate in the first direction and the standard coordinate in the first direction is less than the second threshold, adjusting the pixel values of the second sub-pixel and the third sub-pixel based on a second sub-adjustment mode;

re-obtaining measured color coordinates corresponding to the target pixel of which the pixel values of the second sub-pixel and the third sub-pixel are adjusted;

determining differences between the re-obtained measured color coordinates and the standard color coordinates, until a difference between a re-obtained measured coordinate in the first direction in the re-obtained measured color coordinates and the standard coordinate in the first direction is not greater than a third threshold, and/or a difference between a re-obtained measured coordinate in the second direction in the re-obtained measured color coordinates and the standard coordinate in the second direction is not greater than the third threshold; and ending the color temperature calibration, wherein the second threshold is greater than the third threshold, and the target threshold is not less than the third threshold.

14. The color temperature calibration method according to claim 6, wherein the third method includes:

determining whether the difference between the measured coordinate in the first direction and the standard coordinate in the first direction is less than the first threshold;

if it is determined that the difference between the measured coordinate in the first direction and the standard coordinate in the first direction is not less than the first threshold, increasing the pixel value of the third sub-pixel, re-obtaining a measured coordinate in the first direction corresponding to the target pixel of which the pixel value of the third sub-pixel is adjusted, and determining a difference between the re-obtained measured coordinate in the first direction and the standard coordinate in the first direction, until the difference between the re-obtained measured coordinate in the first direction and the standard coordinate in the first direction is less than the first threshold; and if it is determined that the difference between the measured coordinate in the first direction and the standard coordinate in the first direction is less than the first threshold, increasing the pixel value of the second sub-pixel, re-obtaining a measured coordinate in the second direction corresponding to the target pixel of which the pixel value of the second sub-pixel is adjusted, and determining a difference between the re-obtained measured coordinate in if it is determined that a difference between the measured coordinate in the first direction in the current state and the standard coordinate in the first direction is not less than the second threshold, determining whether the measured coordinate in the first direction in the current state is greater than the standard coordinate in the first direction;

if it is determined that the measured coordinate in the first direction in the current state is greater than the standard coordinate in the first direction, increasing the pixel value of the third sub-pixel;

if it is determined that the measured coordinate in the first direction in the current state is less than the standard coordinate in the first direction, decreasing the pixel value of the third sub-pixel;

re-obtaining a measured coordinate in the first direction corresponding to the target pixel of which the pixel value of the third sub-pixel is adjusted; and determining a difference between the re-obtained measured coordinate in the first direction and the standard coordinate in the first direction, until the difference between the re-obtained measured coordinate in the first direction and the standard coordinate in the first direction is less than the second threshold; and if the difference between the measured coordinate in the first direction in the current state and the standard coordinate in the first direction is less than the second threshold, adjusting the pixel values of the second sub-pixel and the third sub-pixel based on a second sub-adjustment mode;

re-obtaining measured color coordinates corresponding to the target pixel of which the pixel values of the second sub-pixel and the third sub-pixel are adjusted;

determining differences between the re-obtained measured color coordinates and the standard color coordinates, until a difference between a re-obtained measured coordinate in the first direction in the re-obtained measured color coordinates and the standard coordinate in the first direction is not greater than the third threshold, and/or a difference between a re-obtained measured coordinate in the second direction in the re-obtained measured color coordinates and the standard coordinate in the second direction is not greater than the third threshold; and the second direction and the standard coordinate in the second direction, until the difference between the re-obtained measured coordinate in the second direction and the standard coordinate in the second direction is less than a second threshold.

15. The color temperature calibration method according to claim 14, further comprising:

if the difference between the re-obtained measured coordinate in the second direction and the standard coordinate in the second direction is less than the second threshold, comparing a measured coordinate in the first direction in a current state with the standard coordinate in the first direction;

if it is determined that a difference between the measured coordinate in the first direction in the current state and the standard coordinate in the first direction is not less than the second threshold, determining whether the measured coordinate in the first direction in the current state is greater than the standard coordinate in the first direction;

if it is determined that the measured coordinate in the first direction in the current state is greater than the standard coordinate in the first direction, increasing the pixel value of the third sub-pixel;

if it is determined that the measured coordinate in the first direction in the current state is less than the standard coordinate in the first direction, decreasing the pixel value of the third sub-pixel;

re-obtaining a measured coordinate in the first direction corresponding to the target pixel of which the pixel value of the third sub-pixel is adjusted; and determining a difference between the re-obtained measured coordinate in the first direction and the standard coordinate in the first direction, until the difference between the re-obtained measured coordinate in the first direction and the standard coordinate in the first direction is less than the second threshold; or if the difference between the re-obtained measured coordinate in the second direction and the standard coordinate in the second direction is less than the second threshold, comparing a measured coordinate in the first direction in a current state with the standard coordinate in the first direction;

ending the color temperature calibration, wherein the first threshold is greater than the second threshold, the second threshold is greater than the third threshold, the target threshold is not less than the third threshold, and the target threshold is less than or equal to the second threshold.

16. A non-transitory computer-readable storage medium having computer program instructions that, when running in one or more processors of a color temperature self-calibration system, cause the color temperature self-calibration system to perform one or more steps in a color temperature calibration method, the color temperature calibration method comprising:

making a display screen display a test image at a target color temperature;

measuring a chromaticity of a target pixel in the display screen to obtain measured color coordinates of the target pixel;

comparing the measured color coordinates with standard color coordinates;

if differences between the measured color coordinates and the standard color coordinates are greater than a target threshold, adjusting at least one of pixel values of the target pixel, until differences between re-obtained measured color coordinates and the standard color coordinates are not greater than the target threshold; and if differences between the measured color coordinates and the standard color coordinates are not greater than the target threshold, ending the color temperature calibration, wherein: the measured color coordinates include a measured coordinate in a first direction and a measured coordinate in a second direction, and the standard color coordinates includes a standard coordinate in the first direction and a standard coordinate in the second direction; and comparing the measured color coordinates with the standard color coordinates, includes: comparing the measured coordinate in the first direction with the standard coordinate in the first direction, and comparing the measured coordinate in the second direction with the standard coordinate in the second direction, wherein the differences between the measured color coordinates and the standard color coordinates being greater than the target threshold, includes that: a difference between the measured coordinate in the first direction and the standard coordinate in the first direction is greater than the target threshold, and a difference between the measured coordinate in the second direction and the standard coordinate in the second direction is greater than the target threshold, wherein: the target pixel includes a first sub-pixel, a second sub-pixel and a third sub-pixel of different colors; and adjusting the at least one of the pixel values of the target pixel, includes: adjusting at least one of a pixel value of the first sub-pixel, a pixel value of the second sub-pixel, and a pixel value of the third sub-pixel, according to which of the measured coordinate in the first direction and the standard coordinate in the first direction is greater, and which of the measured coordinate in the second direction and the standard coordinate in the second direction is greater, includes:

determining whether the measured coordinate in the first direction is greater than the standard coordinate in the first direction, and whether the measured coordinate in the second direction is greater than the standard coordinate in the second direction;

if it is determined that the measured coordinate in the first direction is greater than the standard coordinate in the first direction, and the measured coordinate in the second direction is greater than the standard coordinate in the second direction, keeping the pixel value of the third sub-pixel unchanged, and adjusting pixel values of the first sub-pixel and the second sub-pixel based on a first adjustment mode; and if it is determined that the measured coordinate in the first direction is not greater than the standard coordinate in the first direction, and/or the measured coordinate in the second direction is not greater than the standard coordinate in the second direction, keeping the pixel value of the first sub-pixel unchanged, and adjusting pixel values of the third sub-pixel and the second sub-pixel based on a second adjustment mode, wherein adjusting the pixel values of the first sub-pixel and the second sub-pixel based on the first adjustment mode includes:

determining whether the difference between the measured coordinate in the first direction and the standard coordinate in the first direction is less than a first threshold;

if it is determined that the difference between the measured coordinate in the first direction and the standard coordinate in the first direction is not less than the first threshold, decreasing the pixel value of the first sub-pixel, re-obtaining a measured coordinate in the first direction corresponding to the target pixel of which the pixel value of the first sub-pixel is adjusted, and determining the difference between the re-obtained measured coordinate in the first direction and the standard coordinate in the first direction, until the difference between the re-obtained measured coordinate in the first direction and the standard coordinate in the first direction is less than the first threshold; and if it is determined that the difference between the measured coordinate in the first direction and the standard coordinate in the first direction is less than the first threshold, decreasing the pixel value of the second sub-pixel, re-obtaining a measured coordinate in the second direction corresponding to the target pixel of which the pixel value of the second sub-pixel is adjusted, and determining the difference between the re-obtained measured coordinate in the second direction and the standard coordinate in the second direction, until the difference between the re-obtained measured coordinate in the second direction and the standard coordinate in the second direction is less than a second threshold.

* * * * *